(12) United States Patent
Silva et al.

(10) Patent No.: US 10,899,860 B2
(45) Date of Patent: Jan. 26, 2021

(54) POLYMERIZATION PROCESSES AND POLYMERS MADE THEREFROM

(71) Applicant: ExxonMobil Chemical Patents Inc., Baytown, TX (US)

(72) Inventors: Adriana S. Silva, Houston, TX (US); Matthew W. Holtcamp, Huffman, TX (US); Ryan W. Impelman, Houston, TX (US); Richard E. Pequeno, Baytown, TX (US); Kevin A. Stevens, Houston, TX (US); Charles J. Harlan, Houston, TX (US); Xuan Ye, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 121 days.

(21) Appl. No.: 16/204,993

(22) Filed: Nov. 29, 2018

(65) Prior Publication Data
US 2020/0071436 A1  Mar. 5, 2020

Related U.S. Application Data

(63) Continuation-in-part of application No. 16/152,470, filed on Oct. 5, 2018, and a continuation-in-part of
(Continued)

(51) Int. Cl.
*C08F 210/16* (2006.01)
*C08F 2/34* (2006.01)
*C08F 2/38* (2006.01)

(52) U.S. Cl.
CPC ............ *C08F 210/16* (2013.01); *C08F 2/34* (2013.01); *C08F 2/38* (2013.01); *C08F 2410/03* (2013.01); *C08F 2800/10* (2013.01)

(58) Field of Classification Search
CPC .......... C08F 4/64; C08F 4/6428; C08F 4/646; C08F 2/34; C08F 2410/03; C08F 210/16; C08F 2500/12; C08F 2/38
See application file for complete search history.

(56) References Cited

U.S. PATENT DOCUMENTS 6,242,545 B1  6/2001  Jejelowo et al.
6,248,845 B1  6/2001  Loveday et al.
(Continued)

FOREIGN PATENT DOCUMENTS

WO  2015123177  8/2015
WO  2015123179  8/2015

OTHER PUBLICATIONS

Namkajorn, M. et al (2016), "Condensed Mode Cooling for Ethylene Polymerization: Part III. The impact of Induced Condensing Agents on Particle Morphology and Polymer Properties", Macromolecular Chemistry and Physics, 2016, 217, pp. 1521-1528.

*Primary Examiner* — Rip A Lee
(74) *Attorney, Agent, or Firm* — ExxonMobil Chemical Patents Inc.—Law Department

(57) ABSTRACT

The present disclosure provides processes for polymerizing olefin(s). Methods can include contacting a first composition and a second composition in a line to form a third composition. The first composition can include a contact product of a first catalyst, a second catalyst, a support, a first activator, a mineral oil. The second composition can include a contact product of an activator, a diluent, and the first catalyst or the second catalyst. Methods can include introducing the third composition from the line into a gas-phase fluidized bed reactor, introducing a condensing agent to the line and/or the reactor, exposing the third composition to polymerization conditions, and/or obtaining a polyolefin. Polyethylene compositions including at least 65 wt % ethylene derived units,
(Continued)

based upon the total weight of the polyethylene composition, are provided.

19 Claims, 3 Drawing Sheets

Related U.S. Application Data application No. 16/152,458, filed on Oct. 5, 2018, and a continuation-in-part of application No. 16/117,008, filed on Aug. 30, 2018, and a continuation-in-part of application No. 16/117,023, filed on Aug. 30, 2018.

(60) Provisional application No. 62/754,217, filed on Nov. 1, 2018, provisional application No. 62/754,224, filed on Nov. 1, 2018, provisional application No. 62/754,231, filed on Nov. 1, 2018, provisional application No. 62/754,237, filed on Nov. 1, 2018, provisional application No. 62/754,241, filed on Nov. 1, 2018, provisional application No. 62/754,248, filed on Nov. 1, 2018.

(56) References Cited

U.S. PATENT DOCUMENTS

| | | | |
|---|---|---|---|
| 6,528,597 B2 | 3/2003 | Loveday et al. | |
| 6,689,847 B2 | 2/2004 | Mawson et al. | |
| 6,908,971 B2 | 6/2005 | Burns et al. | |
| 6,936,675 B2 | 8/2005 | Szul et al. | |
| 6,956,088 B2 | 10/2005 | Farley et al. | |
| 6,956,089 B2 | 10/2005 | Mawson et al. | |
| 7,119,153 B2 | 10/2006 | Jensen et al. | |
| 7,172,816 B2 | 2/2007 | Szul et al. | |
| 7,179,876 B2 | 2/2007 | Szul et al. | |
| 7,381,783 B2 | 6/2008 | Loveday et al. | |
| 7,547,754 B2 | 6/2009 | McDaniel et al. | |
| 7,572,875 B2 | 8/2009 | Jensen et al. | |
| 7,625,982 B2 | 12/2009 | Martin et al. | |
| 7,803,324 B2 | 9/2010 | Burns et al. | |
| 8,247,065 B2 | 8/2012 | Best et al. | |
| 8,378,043 B2 | 2/2013 | Graham et al. | |
| 8,383,754 B2 | 2/2013 | Yang et al. | |
| 8,476,392 B2 | 7/2013 | Kolb et al. | |
| 8,691,715 B2 | 4/2014 | Yang et al. | |
| 8,722,567 B2 | 5/2014 | Slawinski | |
| 8,846,841 B2 | 9/2014 | Yang et al. | |
| 8,940,842 B2 | 1/2015 | Yang et al. | |
| 9,006,367 B2 | 4/2015 | McDaniel et al. | |
| 9,096,745 B2 | 8/2015 | Lam et al. | |
| 9,115,229 B2 | 8/2015 | Slawinski | |
| 9,181,369 B2 | 11/2015 | Tso et al. | |
| 9,181,370 B2 | 11/2015 | Sukhadia et al. | |
| 9,217,049 B2 | 12/2015 | Yang et al. | |
| 9,290,593 B2 | 3/2016 | Cho et al. | |
| 9,334,350 B2 | 5/2016 | McDaniel et al. | |
| 9,441,061 B2 | 9/2016 | Tso et al. | |
| 9,447,265 B2 | 9/2016 | Lam et al. | |
| 9,845,368 B2 | 12/2017 | St. Jean et al. | |
| 2009/0156764 A1 | 6/2009 | Malakoff et al. | |
| 2015/0291748 A1 | 10/2015 | Malakoff | |
| 2016/0347874 A1 | 12/2016 | Boller et al. | |
| 2016/0347886 A1 | 12/2016 | Lue et al. | |
| 2018/0155473 A1 | 6/2018 | Kuhlman | |
| 2018/0223009 A1 | 8/2018 | Kim et al. | |
| 2019/0040167 A1* | 2/2019 | Holtcamp | C08F 210/16 |
| 2019/0119413 A1 | 4/2019 | Holtcamp et al. | |
| 2019/0119417 A1 | 4/2019 | Li et al. | |
| 2019/0127503 A1* | 5/2019 | Joung | C08F 4/659 |
| 2019/0263942 A1* | 8/2019 | Jeong | C08F 210/16 |
| 2020/0071436 A1* | 3/2020 | Silva | C08F 210/16 |
| 2020/0071437 A1* | 3/2020 | Stevens | B01J 8/0015 |

* cited by examiner

POLYMERIZATION PROCESSES AND POLYMERS MADE THEREFROM

CROSS-REFERENCE OF RELATED APPLICATIONS

This Continuation-in-Part Application claims priority to and the benefit of U.S. Ser. No. 16/152,470 filed Oct. 5, 2018, U.S. Ser. No. 16/152,458 filed Oct. 5, 2018, U.S. Ser. No. 16/117,008 filed Aug. 30, 2018, and U.S. Ser. No. 16/117,023 filed Aug. 30, 2018, the disclosures of which are incorporated herein by reference in their entireties. This application claims priority to and the benefit of U.S. Provisional Applications Nos. 62/754,217 filed Nov. 1, 2018, 62/754,224 filed Nov. 1, 2018, 62/754,231 filed Nov. 1, 2018, 62/754,237 filed Nov. 1, 2018, 62/754,241 filed Nov. 1, 2018, and 62/754,248 filed Nov. 1, 2018, the disclosures of which are incorporated herein by reference in its entirety.

FIELD OF THE INVENTION

The present disclosure relates to polymerization processes for producing polyethylene and ethylene copolymers comprising polymerizing ethylene by using mixed catalyst systems with properties tunable in polymerization reactors and polymers resulting therefrom.

BACKGROUND OF THE INVENTION

Olefin polymerization catalysts are of great use in industry to produce polyolefin polymers and these polymers have revolutionized virtually every aspect of the modern world. Hence, there is strong interest in finding new catalyst systems to use in polymerization processes that increase the commercial usefulness of the catalyst systems and allow the production of polyolefin polymers having improved properties or a new combination of properties.

In particular, much effort has been placed in understanding how the comonomer is distributed along the polymer carbon chain or simply polymer chain of a polyolefin polymer. For example, the composition distribution of an ethylene alpha-olefin copolymer refers to the distribution of comonomer (short chain branches) among the molecules that comprise the polyethylene polymer. When the amount of short chain branches varies among the polymer carbon chain, the polymer or resin is said to have a Broad Composition Distribution (BCD). When the amount of comonomer per about 1000 carbons is similar among the polyethylene molecules of different polymer chain lengths or molecular weights, the composition distribution is said to be "narrow" or have a Narrow Composition Distribution (NCD).

The composition distribution is known to influence the properties of copolymers, for example, extractables content, environmental stress crack resistance, heat sealing, dart drop impact resistance, and tear resistance or strength. The composition distribution of a polyolefin may be readily measured by methods known in the art, for example, Temperature Raising Elution Fractionation (TREF) or Crystallization Analysis Fractionation (CRYSTAF). See, for example, U.S. Pat. No. 8,378,043, Col. 3 and Col. 4.

Ethylene alpha-olefin copolymers may be produced in a low pressure reactor, utilizing, for example, solution, slurry, and/or gas phase polymerization processes. Polymerization takes place in the presence of activated catalyst systems such as those employing a Ziegler-Natta catalyst, a chromium based catalyst, a vanadium catalyst, a metallocene catalyst, a mixed catalyst (i.e., two or more different catalysts co-supported on the same carrier such as a bimodal catalyst), other advanced catalysts, or combinations thereof. In general, these catalysts when used in a catalyst system all produce a variety of polymer chains in a polyolefin polymer composition that vary in molecular weight and comonomer incorporation. In some cases, this variation becomes a "signature" to the catalyst itself For example, it is generally known in the art that a polyolefin's composition distribution is largely dictated by the type of catalyst used. For example, Broad Composition Distribution or BCD refers to polymers in which the length of the molecules would be substantially the same but the amount of the comonomer would vary along the length, for example, for an ethylene-hexene copolymer, hexene distribution varies from low to high while the molecular weight is roughly the same or the Polydispersity Index (PDI) is narrow.

Polymers made with Zeigler Natta catalysts are considered to be "conventional" in which the composition distribution is broad but the high molecular weight fractions are higher density (i.e., less comonomer) than the lower molecular weight fraction (high comonomer).

In contrast, metallocene catalysts typically produce a polyolefin polymer composition with an NCD. A metallocene catalyst is generally a metal complex of a transitional metal, typically, a Group 4 metal, and one or more cyclopentadienyl (Cp) ligands or rings. As stated above, NCD generally refers to the comonomer being evenly distributed or not vary much along the polymer chain. An illustration is provided in FIG. 3a.

More recently, a third distribution has been described for a polyolefin polymer composition having a Broad Orthogonal Composition Distribution (BOCD) in which the comonomer is incorporated predominantly in the high molecular weight chains. A substituted hafnocene catalyst has been noted to produce this type of distribution. See, for example, U.S. Pat. Nos. 6,242,545, 6,248,845, 6,528,597, 6,936,675, 6,956,088, 7,172,816, 7,179,876, 7,381,783, 8,247,065, 8,378,043, 8,476,392; U.S. Patent Application Publication No. 2015/0291748; and Ser. No. 62/461,104, filed Feb. 20, 2017, entitled Supported Catalyst Systems and Processes for Use Thereof. An illustration is provided in FIG. 3b. This distribution has been noted for its improved physical properties, for example, ease in fabrication of end-use articles as well as stiffness and toughness in multiple applications such as films that can be measured by dart drop impact resistance and tear resistance or strength.

As taught by U.S. Pat. No. 8,378,043, BOCD refers to incorporating the comonomer predominantly in the high molecular weight chains. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

In another patent, U.S. Pat. No. 9,290,593 ('593 Patent) teaches that the term "BOCD" is a novel terminology that is currently developed and relates to a polymer structure. The term "BOCD structure" means a structure in which the content of the comonomer such as alpha olefins is mainly high at a high molecular weight main chain, that is, a novel structure in which the content of a short chain branching (SCB) is increased as moving toward the high molecular weight. The '593 Patent also teaches a BOCD Index. The BOCD Index may be defined by the following equation:

BOCD Index=(Content of SCB at the high molecular weight side−Content of SCB at the low molecular weight side)/(Content of SCB at the low molecular weight side)

wherein the "Content of SCB at the high molecular weight side" means the content of the SCB (the number of branches/1000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw. The BOCD Index defined by equation above may be in the range of 1 to 5, preferably 2 to 4, more preferably 2 to 3.5. See, also, FIGS. 1 and 2 of the '593 Patent (characterizing BOCD polymer structures using GPC-FTIR data).

BOCD behavior in a polymer composition has been associated with a good balance of mechanical and optical properties and has been an important goal in the development of new polymer products. For example, Linear Low Density Polyethylene (LLDPE) film applications and products strive for a good balance of stiffness, toughness, optical properties (e.g., haze and gloss) and processability. For some LLDPE film applications, sealing performance is also important. Sealing performance is affected mainly by density, it improves as density gets lower, but density has the opposite effect on stiffness. Therefore, to achieve a balanced performance, there is usually a trade-off between stiffness and sealing performance. Thus, to improve sealing performance while maintaining good stiffness remains a challenge. Past efforts have shown that namely molecular weight distribution and comonomer distribution interdependence (MWD×CD) has a strong effect on sealing performance, with narrow CD resin by metallocene catalyst outperforming broad CD resin by conventional catalysts. Other background references include U.S. Patent Application Publication No. 2009/0156764 and U.S. Pat. Nos. 7,119,153, 7,547,754, 7,572,875, 7,625,982, 8,383,754, 8,691,715, 8,722,567, 8,846,841, 8,940,842, 9,006,367, 9,096,745, 9,115,229, 9,181,369, 9,181,370, 9,217,049, 9,334,350, WO 2015/123164, and U.S. Pat. No. 9,447,265.

Thus, there is a need for polyethylene compositions that can exhibit, for example, BCD or BOCD behavior to produce LLDPE film products or other useful articles with a good balance of one or more of high stiffness, toughness and sealing performance, as well as good optical properties (e.g., haze and gloss).

SUMMARY OF THE INVENTION

In a class of embodiments, the invention provides for a method for producing a polyolefin by contacting a first composition and a second composition in a line to form a third composition, which is fed to a gas-phase fluidized bed reactor, along with other feed components, including hydrogen, ethylene, and a one or more $C_3$ to $C_{12}$ alpha olefin comonomer(s). The third composition and the other reactor feed components are then exposed to polymerization conditions in the gas-phase fluidized bed reactor in order to obtain a polyolefin.

The first composition is a slurry formed from the combination of a first bimetallic catalyst and a diluent. The first bimetallic catalyst is the contact product of i) a hafnocene catalyst, ii) a zirconocene catalyst, iii) a support, and iv) an activator, wherein the mol ratio of hafnium to zirconium is from 95:5 to 70:30.

The second composition comprises a zirconocene catalyst, which may be the same or different from the zirconocene catalyst in the first bimetallic catalyst, and a solvent. This in the zirconocene catalyst is dissolved in the solvent to form a solution.

The third composition comprises a second bimetallic catalyst having mol ratio of hafnium to zirconium of from 85:15 to 50:50. The third composition is formed by mixing the first composition and the second composition in a feed line.

The polymerization conditions in some embodiments include: a hydrogen concentration in the range of from 50 ppm to 2000 ppm, an ethylene concentration in the range of from 35 mol % to 95 mol %; a comonomer concentration in the range of from 0.2 mol % to 2 mol %; a reactor pressure in the range of from 200 psig to 500 psig; and a reactor temperature in the range of from 100° F. to 250° F.

In a another class of embodiments, the invention provides for a method for producing a polyolefin by feeding a first bimetallic catalyst in diluent as a slurry to a gas-phase fluidized bed reactor, along with other feed components, including hydrogen, ethylene, a one or more $C_3$ to $C_{12}$ alpha olefin comonomer(s), and a second bimetallic catalyst. The first bimetallic catalyst in diluent as a slurry and the other reactor feed components are then exposed to polymerization conditions in the gas-phase fluidized bed reactor in order to obtain a polyolefin. The first bimetallic catalyst and the second bimetallic catalyst are the same or different and are each the contact product of i) a hafnocene catalyst, ii) a zirconocene catalyst, iii) a support, and iv) an activator, wherein the mol ratio of hafnium to zirconium is from 95:5 to 70:30.

In some embodiments, the polyolefin so produced is a polyethylene composition comprising at least 65 wt % ethylene derived units and from 0.1 to 35 wt % of $C_3$-$C_{12}$ olefin comonomer derived units, based upon the total weight of the polyethylene composition; wherein the polyethylene composition has:
a) an RCI,m of 100 kg/mol or greater, such as 150 kg/mol or greater; and one or more of the following:
b) a density of from 0.890 g/cm$^3$ to 0.940 g/cm$^3$;
c) a melt index (MI) of from 0.1 g/10 min to 30 g/10 min;
d) a melt index ratio ($I_{21}/I_2$) of from 10 to 90;
e) an $M_w/M_n$ of from 2 to 16;
f) an $M_z/M_w$ of from 2.5 to 5.0;
g) an $M_z/M_n$ of from 10 to 50; and
h) a g'(vis) of 0.90 or greater.

In another class of embodiments, the invention provides for polymers made from the disclosed processes.

DETAILED DESCRIPTION

Figure 1:
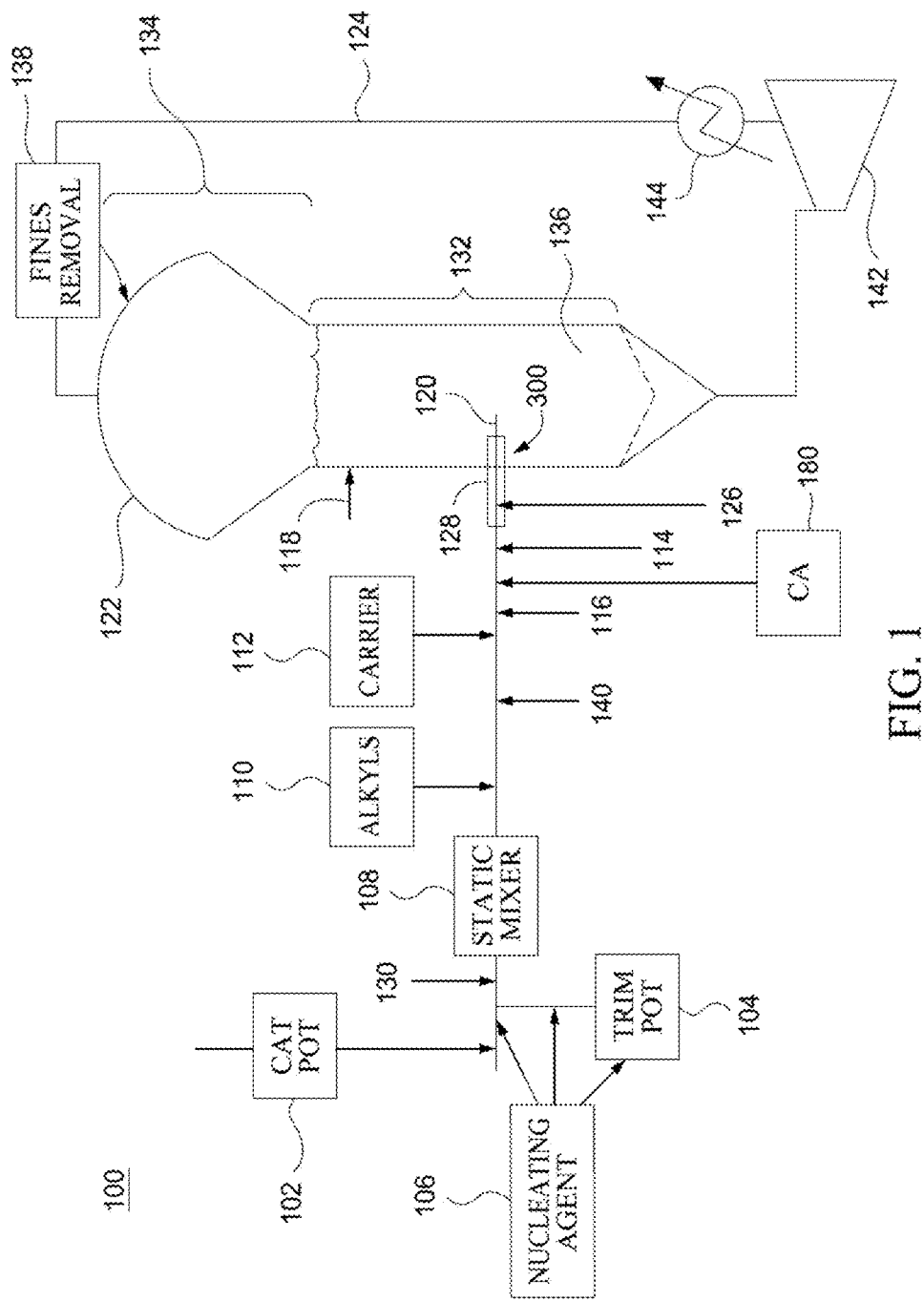
FIG. 1 is a schematic of a gas-phase reactor system, according to one embodiment.

Before the present compounds, components, compositions, and/or methods are disclosed and described, it is to be understood that unless otherwise indicated this invention is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

In several classes of embodiments of the invention, the present disclosure is directed to catalyst systems and their use in polymerization processes to produce polyolefin polymers such as polyethylene polymers and polypropylene polymers. In another class of embodiments, the present disclosure is directed to polymerization processes to produce polyolefin polymers from catalyst systems comprising the product of the combination of one or more olefin polymerization catalysts, at least one activator, and at least one support.

In particular, the present disclosure is directed to a polymerization process to produce a polyethylene polymer, the process comprising contacting a catalyst system comprising the product of the combination of two or more metallocene catalysts, at least one activator, and at least one support, with ethylene and one or more $C_3$-$C_{10}$ alpha-olefin comonomers under polymerizable conditions.

Definitions

For purposes of this invention and the claims hereto, the numbering scheme for the Periodic Table Groups is according to the new notation of the IUPAC Periodic Table of Elements.

As used herein, "olefin polymerization catalyst(s) refers to any catalyst, typically an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$," means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

For purposes of this invention and claims thereto, unless otherwise indicated, the term "substituted" means that a hydrogen group has been replaced with a heteroatom, or a heteroatom containing group (such as halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring), or a hydrocarbyl group, except that substituted hydrocarbyl is a hydrocarbyl in which at least one hydrogen atom of the hydrocarbyl has been substituted with at least one heteroatom or heteroatom containing group, such as halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The terms "hydrocarbyl radical," "hydrocarbyl," "hydrocarbyl group," "alkyl radical," and "alkyl" are used interchangeably throughout this document. Likewise, the terms "group," "radical," and "substituent," are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues.

As used herein, and unless otherwise specified, the term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl ($-CH_3$), "$C_2$ alkyl" refers to ethyl ($-CH_2CH_3$), "$C_3$ alkyl" refers to propyl ($-CH_2CH_2CH_3$) and "$C_4$ alkyl" refers to butyl (e.g., $-CH_2CH_2CH_2CH_3$, $-(CH_3)CHCH_2CH_3$, $-CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e., $C_1$-$C_{12}$ alkylene) in length and meaning the alkylene moiety is attached to the rest of the molecule at both ends of the alkyl unit. For example, alkylenes include, but are not limited to, $-CH_2-$, $-CH_2CH_2-$, $-CH(CH_3)CH_2-$, $-CH_2CH_2CH_2-$, etc. The alkylene group may be linear or branched.

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.,) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, $-CH=CH-$, $-CH=CHCH_2-$, $-CH=CH=CH-$, $-CH_2CH_2CH=CHCH_2-$, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompasses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —C≡C—, —C≡CCH$_2$—, —C≡CCH$_2$C≡C—, —CH$_2$CH$_2$C≡CCH$_2$—. The alkynylene group may be linear or branched.

As used herein, and unless otherwise specified, the term "alkoxy" refers to —O— alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated 7E system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "hydroxyl" refers to an —OH group.

As used herein, "oxygenate" refers to a saturated, unsaturated, or polycyclic cyclized hydrocarbon radical containing from 1 to 40 carbon atoms and further containing one or more oxygen heteroatoms.

As used herein, "aluminum alkyl adducts" refers to the reaction product of aluminum alkyls and/or alumoxanes with quenching agents, such as water and/or methanol.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are distinct or different from each other. A "terpolymer" is a polymer having three mer units that are distinct or different from each other. "Distinct" or "different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

"Polymerizable conditions" refer those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer through typically coordination polymerization.

The term "continuous" means a system that operates without interruption or cessation. For example a continuous process to produce a polymer would be one where the reactants are continually introduced into one or more reactors and polymer product is continually withdrawn.

A "catalyst composition" or "catalyst system" is the combination of at least two catalyst compounds, a support material, an optional activator, and an optional co-activator. For the purposes of this invention and the claims thereto, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

Coordination polymerization is an addition polymerization in which successive monomers are added to or at an organometallic active center to create and/or grow a polymer chain.

The terms "cocatalyst" and "activator" are used herein interchangeably and are defined to be any compound which can activate any one of the catalyst compounds herein by converting the neutral catalyst compound to a catalytically active catalyst compound cation.

The term "contact product" or "the product of the combination of" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another or react in the manner as theorized. Similarly, the term "contacting" is used herein to refer to materials which may be blended, mixed, slurried, dissolved, reacted, treated, or otherwise contacted in some other manner.

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the polymers as described herein may have a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, 25.0 or greater, 30.0 or greater, 35.0 or greater, 40.0 or greater, or 45.0 or greater, wherein $T_{25}$ is the temperature at which 25% of the eluted polymer is obtained and $T_{75}$ is the temperature at which 75% of the eluted polymer is obtained in a TREF experiment as described herein.

The polymers as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Olefin Polymerization Catalysts

Metallocene Catalysts

The catalyst system useful herein is a mixed metallocene catalyst system comprising two or more different metallocene catalyst compounds, at least one activator, and at least one support. A first metallocene catalyst compound is one or more hafnocene catalyst compounds represented by formula (A1) and/or formula (A2) below. A second metallocene catalyst compound is one or more zirconocene catalyst compounds represented by formula (B) below.

Hafnocenes

In some embodiments, the first metallocene catalyst compound is represented by the formula (A1):

$$Cp^A Cp^B M'X'_n \qquad (A1)$$

wherein,
Cp$^A$ is a cyclopentadienyl group which may be substituted or unsubstituted, provided that Cp$^A$ is substituted with at least one R group, where R is a group containing at least three carbon or silicon atoms, preferably R is a $C_3$ to $C_{12}$ alky group, preferably R is a linear $C_3$ to $C_{12}$ alkyl group (such as n-propyl, n-butyl, n-pentyl, n-hexyl, n-heptyl, n-octyl, n-nonyl, n-decyl, n-undecyl or n-dodecyl), and Cp$^A$ is optionally also independently substituted by one, two, three, or four R" groups;

Cp$^B$ is a cyclopentadienyl group which may be substituted or unsubstituted, substituted by one, two, three, four, or five R" groups or R** groups;

M' is Hf;

each X' is, independently, a univalent anionic ligand, or two X' are joined and bound to the metal atom to form a metallocycle ring, or two X' are joined to form a chelating ligand, a diene ligand, or an alkylidene ligand (preferably each X' is independently, halogen or $C_1$ to $C_{12}$ alkyl or $C_5$ to $C_{12}$ aryl, such as Br, Cl, I, Me, Et, Pr, Bu, Ph);

n is 0, 1, 2, 3, or 4, preferably n is 2; and each R" is independently selected from the group consisting of hydrocarbyl, substituted hydrocarbyl, heteroatom, or heteroatom containing group.

In a preferred embodiment of the invention, Cp$^A$ and Cp$^B$ are each substituted with at least one R** group, preferably n-propyl or n-butyl.

In a preferred embodiment of the invention, each R" is independently selected from the group consisting of alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In a preferred embodiment of the invention, each R" is independently hydrogen, or a substituted $C_1$ to $C_{12}$ hydrocarbyl group or an unsubstituted $C_1$ to $C_{12}$ hydrocarbyl group, preferably R" is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

More particular, non-limiting examples of R" include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like.

Preferably R** is a $C_3$ to $C_4$ hydrocarbyl (preferably n-propyl or n-butyl).

In a preferred embodiment of the invention, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, bromo, or chloro group. Preferably, each X is, independently, a halide, a hydride, an alkyl group, an alkenyl group or an arylalkyl group.

Compounds useful as the first metallocene are disclosed in U.S. Pat. No. 6,242,545, which is incorporated by reference herein.

In at least one embodiment, the first metallocene catalyst represented by the formula: (A) produces a polyolefin having a high comonomer content.

Preferably the first metallocene(s) are selected from the group consisting of: bis(n-propylcyclopentadienyl)hafnium dichloride, bis(n-propylcyclopentadienyl)hafnium dimethyl, (n-propylcyclopentadienyl, pentamethylcyclopentadienyl) hafnium dichloride, (n-propylcyclopentadienyl, pentamethylcyclopentadienyl)hafnium dimethyl, (n-propylcyclopentadienyl, tetramethylcyclopentadienyl)hafnium dichloride, (n-propylcyclopentadienyl, tetramethylcyclopentadienyl) hafnium dimethyl, bis(cyclopentadienyl)hafnium dimethyl, bis(n-butylcyclopentadienyl)hafnium dichloride, bis(n-butylcyclopentadienyl)hafnium dimethyl, and bis(1-methyl-3-n-butylcyclopentadienyl)hafnium dimethyl.

For purposes of this invention, one catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenylindenyl)hafnium dimethyl is considered to be the same as meso-dimethylsilylbis(2-methyl 4-phenylindenyl)hafnium dimethyl.

In some embodiments, the first metallocene catalyst compound is represented by the formula (A2):
(i) a metallocene catalyst represented by the formula (A2):

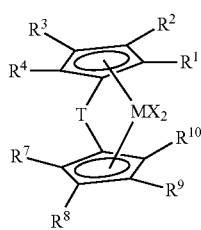

A2 where:
M is Hafnium;
each R', $R^2$, and $R^4$ is independently hydrogen, alkoxide, or a $C_1$ to C40 substituted or unsubstituted hydrocarbyl group (preferably a $C_1$ to $C_{20}$ substituted or unsubstituted hydrocarbyl group);
$R^3$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group), or is —$R^{20}$—SiR'$_3$ or —$R^{20}$—CR'$_3$ where $R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H; each $R^7$, $R^8$, and $R^{10}$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);

$R^9$ is —$R^{20}$—SiR'$_3$ or —$R^{20}$—CR'$_3$ where $R^{20}$ is hydrogen or a $C_1$ to $C_4$ hydrocarbyl (preferably $R^{20}$ is CH$_2$), and each R' is independently a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H;
T is a bridging group, such as $CR^{21}R^{22}$, where $R^{21}$ and $R^{22}$ are independently hydrogen, halogen, or a $C_1$-C20 containing hydrocarbyl group (for example, linear hydrocarbyl group), substituted hydrocarbyl group, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and each X is, independently, a univalent anionic ligand, or two X are joined and bound to the metal atom to form a metallocycle ring, or two X are joined to form a chelating ligand, a diene ligand, or an alkylidene ligand (preferably halogen or C1 to C12 alkyl or aryl, such as Cl, Me, Et, Ph).

In a preferred embodiment of the invention, M is Hf, alternately M is Zr.

In a preferred embodiment of the invention, each $R^1$, $R^2$, and $R^4$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, each $R^3$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or $R^3$ is —$R^{20}$—SiR'$_3$ or —$R^{20}$—CR'$_3$ where $R^{20}$ is a $C_1$ to $C_4$ hydrocarbyl (preferably methyl, ethyl, propyl, butyl), and $R^1$ is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

In a preferred embodiment of the invention, each $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, $R^9$, is —$R^{20}$—SiR'$_3$ or —$R^{20}$—CR'$_3$ where $R^{20}$ is a $C_1$ to $C_4$ hydrocarbyl (preferably methyl, ethyl, propyl, butyl), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Alternately, $R^9$ and optionally $R^3$ are, independently, —$R^{20}$—CMe$_3$, or —$R^{20}$—SiMe$_3$ where $R^{20}$ is a $C_1$ to $C_4$ hydrocarbyl (preferably methyl, ethyl, propyl, butyl), preferably —CH$_2$—CMe$_3$, or —CH$_2$—SiMe$_3$.

Alternately, each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, bromo, or chloro group.

Preferably, T is a bridging group containing at least one Group 13, 14, 15, or 16 element, in particular boron or a Group 14, 15 or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR', where R' is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment of the invention in any embodiment of any formula described herein, T is represented by the formula R$^a_2$J or (R$^a_2$J)$_2$, where J is C, Si, or Ge, and each Ra is, independently, hydrogen, halogen, C$_1$ to C$_{20}$ hydrocarbyl (such as methyl, ethyl, propyl, butyl, pentyl, hexyl, heptyl, octyl, nonyl, decyl, undecyl, or dodecyl) or a C$_1$ to C$_{20}$ substituted hydrocarbyl, and two Ra can form a cyclic structure including aromatic, partially saturated, or saturated cyclic or fused ring system. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

In a preferred embodiment of the invention, the molar ratio of rac to meso in the catalyst compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater. In an embodiment of the invention, the catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 97 mol % of the racemic isomer, based on the total amount of the racemic and meso isomer, if any, formed. In a particular embodiment of the invention, the metallocene transition metal compound formed consists essentially of the racemic isomer.

Amounts of rac and meso isomers are determined by proton NMR. 1H NMR data are collected at 23° C. in a 5 mm probe using a 400 MHz Bruker spectrometer with deuterated methylene chloride. (Note that some of the examples herein may use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

Catalyst compounds that are particularly useful in this invention include one or more of: rac/meso Me$_2$Si(Me$_3$SiCH$_2$Cp)$_2$HfMe$_2$; racMe$_2$Si(Me$_3$SiCH$_2$Cp)$_2$HfMe$_2$; rac/meso Ph$_2$Si(Me$_3$SiCH$_2$Cp)$_2$HfMe$_2$; rac/meso (CH$_2$)$_3$Si(Me$_3$SiCH$_2$Cp)$_2$HfMe$_2$; rac/meso (CH$_2$)$_4$Si(Me$_3$SiCH$_2$Cp)$_2$HfMe$_2$; rac/meso (C$_6$F$_5$)$_2$Si(Me$_3$SiCH$_2$Cp)$_2$HfMe$_2$; rac/meso (CH$_2$)$_3$Si(Me$_3$SiCH$_2$Cp)$_2$ZrMe$_2$; rac/meso Me$_2$Ge(Me$_3$SiCH$_2$Cp)$_2$HfMe$_2$; rac/meso Me$_2$Si(Me$_2$PhSiCH$_2$Cp)$_2$HfMe$_2$; rac/meso Ph$_2$Si(Me$_2$PhSiCH$_2$Cp)$_2$HfMe$_2$; Me$_2$Si(Me$_4$Cp)(Me$_2$PhSiCH$_2$Cp)HfMe$_2$; rac/meso (CH$_2$)$_3$Si(Me$_2$PhSiCH$_2$Cp)$_2$HfMe$_2$; rac/meso (CH$_2$)$_4$Si(Me$_2$PhSiCH$_2$Cp)$_2$HfMe$_2$; rac/meso (C$_6$F$_5$)$_2$Si(Me$_2$PhSiCH$_2$Cp)$_2$HfMe$_2$; rac/meso Me$_2$Ge(Me$_2$PhSiCH$_2$Cp)$_2$HfMe$_2$; rac/meso Me$_2$Si(Me$_2$PhSiCH$_2$Cp)$_2$HfMe$_2$; rac/meso Ph$_2$Si(MePh$_2$SiCH$_2$Cp)$_2$HfMe$_2$; rac/meso Me$_2$Si(MePh$_2$SiCH$_2$Cp)$_2$HfMe$_2$; rac/meso (MePh$_2$SiCH$_2$Cp)$_2$ZrMe$_2$; rac/meso (CH$_2$)$_3$Si(MePh$_2$SiCH$_2$Cp)$_2$HfMe$_2$; rac/meso (CH$_2$)$_4$Si(MePh$_2$SiCH$_2$Cp)$_2$HfMe$_2$; rac/meso (C$_6$F$_5$)$_2$Si(MePh$_2$SiCH$_2$Cp)$_2$HfMe$_2$; rac/meso Me$_2$Ge(MePh$_2$SiCH$_2$Cp)$_2$HfMe$_2$; rac/meso Me$_2$Si(Ph$_3$SiCH$_2$Cp)$_2$HfMe$_2$; rac/meso Ph$_2$Si(Ph$_3$SiCH$_2$Cp)$_2$HfMe$_2$; rac/meso Me$_2$Si(Ph$_3$SiCH$_2$Cp)$_2$ZrMe$_2$; rac/meso (CH$_2$)$_3$Si(Ph$_3$SiCH$_2$Cp)$_2$HfMe$_2$; rac/meso (CH$_2$)$_4$Si(Ph$_3$SiCH$_2$Cp)$_2$HfMe$_2$; rac/meso (C$_6$F$_5$)$_2$Si(Ph$_3$SiCH$_2$Cp)$_2$HfMe$_2$; rac/meso Me$_2$Ge(Ph$_3$SiCH$_2$Cp)$_2$HfMe$_2$; rac/meso Me$_2$Si(Cy$_3$SiCH$_2$Cp)$_2$HfMe$_2$; racMe$_2$Si(Cy$_3$SiCH$_2$Cp)$_2$HfMe$_2$; rac/meso Ph$_2$Si(Cy$_3$SiCH$_2$Cp)$_2$HfMe$_2$; rac/meso Me$_2$Si(Cy$_3$SiCH$_2$Cp)$_2$ZrMe$_2$; rac/meso (CH$_2$)$_3$Si(Cy$_3$SiCH$_2$Cp)$_2$HfMe$_2$; rac/meso (CH$_2$)$_4$Si(Cy$_3$SiCH$_2$Cp)$_2$HfMe$_2$; rac/meso (C$_6$F$_5$)$_2$Si(Cy$_3$SiCH$_2$Cp)$_2$HfMe$_2$; rac/meso Me$_2$Ge(Cy$_3$SiCH$_2$Cp)$_2$HfMe$_2$; rac/meso Me$_2$Si(Cy$_2$MeSiCH$_2$Cp)$_2$HfMe$_2$; rac/meso Ph$_2$Si(Cy$_2$MeSiCH$_2$Cp)$_2$HfMe$_2$; Me$_2$Si(Me$_4$Cp)(Cy$_2$MeSiCH$_2$Cp)HfMe$_2$; rac/meso (CH$_2$)$_3$Si(Cy$_2$MeSiCH$_2$Cp)$_2$HfMe$_2$; rac/meso (CH$_2$)$_4$Si(Cy$_2$MeSiCH$_2$Cp)$_2$HfMe$_2$; rac/meso (C$_6$F$_5$)$_2$Si(Cy$_2$MeSiCH$_2$Cp)$_2$HfMe$_2$; rac/meso Me$_2$Ge(Cy$_2$MeSiCH$_2$Cp)$_2$HfMe$_2$; rac/meso Me$_2$Si(Cy$_2$MeSiCH$_2$Cp)$_2$HfMe$_2$; rac/meso Ph$_2$Si(CyMe$_2$SiCH$_2$Cp)$_2$HfMe$_2$; rac/meso (CH$_2$)$_3$Si(CyMe$_2$SiCH$_2$Cp)$_2$HfMe$_2$; rac/meso (CH$_2$)$_4$Si(CyMe$_2$SiCH$_2$Cp)$_2$HfMe$_2$; rac/meso (C$_6$F$_5$)$_2$Si(CyMe$_2$SiCH$_2$Cp)$_2$HfMe$_2$; rac/meso Me$_2$Ge(CyMe$_2$SiCH$_2$Cp)$_2$HfMe$_2$; rac/meso Me$_2$Si(CyMe$_2$SiCH$_2$Cp)$_2$HfMe$_2$; rac/meso (Cy$_2$PhSiCH$_2$Cp)$_2$HfMe$_2$; rac/meso Ph$_2$Si(Cy$_2$PhSiCH$_2$Cp)$_2$HfMe$_2$; rac/meso (CH$_2$)$_3$Si(Cy$_2$PhSiCH$_2$Cp)$_2$HfMe$_2$; rac/meso (CH$_2$)$_4$Si(Cy$_2$PhSiCH$_2$Cp)$_2$HfMe$_2$; rac/meso (C$_6$F$_5$)$_2$Si(Cy$_2$PhSiCH$_2$Cp)$_2$HfMe$_2$; rac/meso Me$_2$Ge(Cy$_2$PhSiCH$_2$Cp)$_2$HfMe$_2$; rac/meso Me$_2$Si(CyPh$_2$SiCH$_2$Cp)$_2$HfMe$_2$; rac/meso Ph$_2$Si(CyPh$_2$SiCH$_2$Cp)$_2$HfMe$_2$; rac/meso (CH$_2$)$_3$Si(CyPh$_2$SiCH$_2$Cp)$_2$HfMe$_2$; rac/meso (CH$_2$)$_4$Si(CyPh$_2$SiCH$_2$Cp)$_2$HfMe$_2$; rac/meso (C$_6$F$_5$)$_2$Si(CyPh$_2$SiCH$_2$Cp)$_2$HfMe$_2$; and rac/meso Me$_2$Ge(CyPh$_2$SiCH$_2$Cp)$_2$HfMe$_2$.

In a preferred embodiment in any of the processes described herein, one catalyst compound is used, e.g., the catalyst compounds are not different. For purposes of this invention, one catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenylindenyl)hafnium dimethyl is considered to be the same as meso-dimethylsilylbis(2-methyl 4-phenylindenyl)hafnium dimethyl. Zirconocenes Metallocene catalyst compounds useful herein are compounds different from compounds represented by formulas A1 and A2 and are compounds represented by the formula (B):

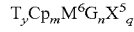

wherein,
each Cp is, independently, a cyclopentadienyl group (such as cyclopentadiene, indene or fluorene) which may be substituted or unsubstituted, provided that at least one Cp is an indene or fluorene group;
$M^6$ is a zirconium;
G is a heteroatom group represented by the formula $JR^*_z$ where J is N, P, O or S, and $R^*$ is a $C_1$ to $C_{20}$ hydrocarbyl group and z is 1 or 2;
T is a bridging group;
y is 0 or 1;
$X^5$ is a leaving group (such as a halide, a hydride, an alkyl group, an alkenyl group or an arylalkyl group);
m is 1 or 2;
n is 0, 1, 2 or 3;
q is 0, 1, 2, or 3; and
the sum of m+n+q is equal to the oxidation state of the transition metal, preferably 4. See, for example, WO 2016/094843.

In a preferred embodiment of the invention, each Cp is, independently, an indenyl group which may be substituted or unsubstituted, preferably each Cp is independently substituted with a $C_1$ to $C_{40}$ hydrocarbyl group or an unsubstituted $C_1$ to $C_{40}$ hydrocarbyl group, preferably Cp is an indenyl group substituted with a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Preferably, T is present (e.g., y=1) and is a bridging group containing at least one Group 13, 14, 15, or 16 element, in particular boron or a Group 14, 15 or 16 element. Examples of suitable bridging groups include P(=S)R', P(=Se)R', P(=O)R', R'$_2$C, R'$_2$Si, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—BR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two Ra can form a cyclic structure including aromatic, partially saturated, or saturated cyclic or fused ring system. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

In a preferred embodiment of the invention, $M^6$ is Zr.

In a preferred embodiment of the invention, G is an alkyl amido group, preferably t-butyl amido or do-decyl amido.

In a preferred embodiment of the invention, each $X^5$ is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two $X^5$'s may form a part of a fused ring or a ring system), preferably each $X^5$ is independently selected from halides, aryls and $C_1$ to $C_5$ alkyl groups, preferably each $X^5$ is a phenyl, methyl, ethyl, propyl, butyl, pentyl, bromo, or chloro group. Preferably, each $X^5$ is, independently, a halide, a hydride, an alkyl group, an alkenyl group or an arylalkyl group.

In an embodiment, each Cp is independently an indene, which may be substituted or unsubstituted, each $M^6$ is zirconium, and each $X^5$ is, independently, a halide, a hydride, an alkyl group, an alkenyl group or an arylalkyl group. In any of the embodiments described herein, y may be 1, m may be one, n may be 1, J may be N, and $R^*$ may be methyl, ethyl, propyl, butyl, pentyl, hexyl, heptyl, octyl, nonyl, cyclooctyl, cyclododecyl, decyl, undecyl, dodecyl, adamantyl or an isomer thereof.

In yet another embodiment, the one or more second metallocene polymerization catalysts may comprise one or more metallocene catalysts of: bis(tetrahydroindenyl)Hf Me$_2$; (dimethylsilyl)$_2$O bis(indenyl)ZrCl$_2$; dimethylsilylbis (tetrahydroindenyl)ZrCl$_2$; dimethylsilyl-(3-phenyl-indenyl) (tetramethylcyclopentadienyl)ZrCl$_2$; tetramethyldisilylene bis(4-(3,5-di-tert-butylphenyl)-indenyl)ZrCl$_2$; bis(indenyl) zirconium dichloride; bis(indenyl)zirconium dimethyl; bis (tetrahydro-1-indenyl)zirconium dichloride; bis(tetrahydro-1-indenyl)zirconium dimethyl; dimethylsilylbis (tetrahydroindenyl)zirconium dichloride; dimethylsilylbis (tetrahydroindenyl)zirconium dimethyl; dimethylsilylbis (indenyl)zirconium dichloride; or dimethylsilyl(bisindenyl) zirconium dimethyl.

In another class of embodiments, the second metallocene catalysts may comprise bis(indenyl)zirconium dichloride, bis(indenyl)zirconium dimethyl, bis(tetrahydro-1-indenyl) zirconium dichloride, bis(tetrahydro-1-indenyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1- butylindenyl)zirconium dimethyl, meso-bis(1ethylindenyl) zirconium dichloride, meso-bis(1-ethylindenyl) zirconium dimethyl, (1-methylindenyl)(pentamethyl cyclopentadienyl) zirconium dichloride, (1-methylindenyl)(pentamethyl cyclopentadienyl) zirconium dimethyl, or combinations thereof.

In yet another class of embodiments, the one or more metallocene catalyst may comprise rac/meso-bis(1-ethylindenyl)zirconium dichloride, rac/meso-bis(1-ethylindenyl) zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl) zirconium dichloride, meso-bis (1ethylindenyl) zirconium dimethyl, (1-methylindenyl)(pentamethyl cyclopentadienyl) zirconium dichloride, (1-methylindenyl)(pentamethyl cyclopentadienyl) zirconium dimethyl, or combinations thereof.

Mixed Catalyst Systems

Two or more of the metallocene catalysts as described herein (preferably at least one catalyst compound represented by formula (A1) and/or (A2) and at least one catalyst compound represented by formula (B)) may be used in a mixed catalyst system also known as a dual catalyst system comprising, for example, two or three metallocene catalysts or any of the catalysts described herein or known in the art to be useful for olefin polymerization. They are preferably co-supported, that is disposed on the same support material, optionally and in addition to, injected into the reactor(s) separately (with or without a support) or in different combinations and proportions together to "trim" or adjust the polymer product properties according to its target specification. This approach is very useful in controlling polymer product properties and insuring uniformity in high volume production of polyolefin polymers.

For example, catalyst combinations such as bis(1-ethylindenyl) zirconium dimethyl and bis(n-propyl-cyclopentadienyl) hafnium dimethyl, may be used in a catalyst system or a mixed catalyst system, sometimes also referred to as a dual catalyst system if only two catalysts are used. Particularly preferred catalyst systems comprise bis(1-ethyl-indenyl) zirconium dimethyl, bis(n-propyl-cyclopentadienyl) hafnium dimethyl, a support such as silica, and an activator such as an alumoxane (i.e., methylalumoxane).

The two transition metal compounds may be used in any ratio. Preferred molar ratios of all compounds represented by the formula (A) to all compounds represented by the formula (B) fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalysts chosen, the method of activation, and the end product desired. In a particular embodiment, when using the two catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The catalyst compositions may be combined with activators in any manner in the art including by supporting them for use in slurry or gas phase polymerization. Activators are generally compounds that can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst compositions described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In a class of embodiments, little or no (zero %) alumoxane is used in the polymerization processes described herein. Alternatively, the alumoxane is present at a molar ratio of aluminum to catalyst compound transition metal less than 500:1, preferably less than 300:1, preferably less than 100:1, and preferably less than 1:1.

In another class of embodiments, the at least one activator comprises aluminum and the aluminum to transition metal, for example, hafnium or zirconium, ratio is at least 150 to 1; the at least one activator comprises aluminum and the aluminum to transition metal, for example, hafnium or zirconium, ratio is at least 250 to 1; or the at least one activator comprises aluminum and the aluminum to transition metal, for example, hafnium or zirconium, ratio is at least 1,000 to 1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, trimethylammonium tetrakis(perfluorophenyl)borate; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Support Materials

The catalyst composition comprises at least one "support" or sometimes also referred to as a "carrier". The terms may be interchangeable unless otherwise distinguished. Suitable supports, include but are not limited to, silica, alumina, silica-alumina, zirconia, titania, silica-alumina, cerium oxide, magnesium oxide, or combinations thereof. The catalyst may optionally comprise a support or be disposed on at least one support. Suitable supports, include but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the support may be silica-alumina, alumina and/or a zeolite, particularly alumina. Silica-alumina may be either naturally occurring or in the form of gelatinous precipitates or gels including mixtures of silica and metal oxides.

In class of embodiments, the at least one support may comprise an organosilica material. The organosilica material supports may be a polymer formed of at least one monomer. In certain embodiments, the organosilica material may be a polymer formed of multiple distinct monomers. Methods and materials for producing the organosilica materials as well as a characterization description may be found in, for example, WO 2016/094770 and WO 2016 094774.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

Scavengers, Chain Transfer Agents and/or Co-Activators

Scavengers, chain transfer agents, or co-activators may also be used. Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

Useful chain transfer agents that may also be used herein are typically a compound represented by the formula $AlR^{20}_3$, $ZnR^{20}_2$ (where each $R^{20}$ is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Catalyst Component Solution (the "Trim Solution")

The catalyst component solution may include only catalyst compound(s), such as a metallocene, or may include an activator. In at least one embodiment, the catalyst compound(s) in the catalyst component solution is unsupported. The catalyst solution used in the trim process can be prepared by dissolving the catalyst compound and optional activators in a liquid solvent. The liquid solvent may be an alkane, such as a $C_5$ to $C_{30}$ alkane, or a $C_5$ to $C_{10}$ alkane. Cyclic alkanes such as cyclohexane and aromatic compounds such as toluene may also be used. Mineral oil may be used as a solvent alternatively or in addition to other alkanes such as a $C_5$ to $C_{30}$ alkane. Mineral oil can have a density of from 0.85 g/cm³ to 0.9 g/cm³ at 25° C. according to ASTM D4052, such as from 0.86 g/cm³ to 0.88 g/cm³. Mineral oil can have a kinematic viscosity @25° C. of from 150 cSt to 200 cSt according to ASTM D341, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HYDROBRITE® 380 PO White Mineral Oil ("HB380") from Sonneborn, LLC.

The solution employed should be liquid under the conditions of polymerization and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt %, at up to about 50 wt %, at up to about 20 wt %, preferably at up to about 10 wt %, at up to about 5 wt %, at less than 1 wt %, or between 100 ppm and 1 wt %, based upon the weight of the solvent and the activator or catalyst compound.

The catalyst component solution can include any one of the catalyst compound(s) of the present disclosure. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxylated amines, and anti-static compositions such as those provided by Innospec Inc. under the trade name OCTASTAT. For example, OCTASTAT 2000 is a mixture of a polysulfone copolymer, a polymeric polyamine, and oil soluble sulfonic acid.

Any of the mentioned control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula: —(CH$_2$—CH$_2$—NH)n-, where n may be from about 10 to about 10,000. The polyethyleneimines may be linear, branched, or hyper branched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —(CH$_2$—CH$_2$—NH)n- may be used as the polyethyleneimine, materials having primary, secondary, and tertiary branches can also be used. Commercial polyethyleneimine can be a compound having branches of the ethyleneimine polymer.

Gas Phase Polymerization Reactor

FIG. 1 is a schematic of a gas-phase reactor system 100, showing the addition of at least two catalysts, at least one of which is added as a trim catalyst. The catalyst component slurry in diluent, such as a mineral oil slurry, including at least one support and at least one activator, and at least one catalyst compound (such as two different catalyst compounds) may be placed in a vessel or catalyst pot (cat pot) 102. The slurry diluent can further include a wax, which can provide increased viscosity to the mineral oil slurry, which provides for use of a slurry roller of conventional trim processes to be merely optional. Lower viscosity slurries of conventional trim processes involve rolling the slurry cylinders immediately prior to use. Not using a slurry roller can provide reduced or eliminated foam when the slurry is transferred down in pressure to the slurry vessel (e.g., cat pot 102). In some embodiments, the viscosity of a mineral oil slurry comprising a wax is such that the time scale of settling of suspended solids in the slurry is longer than the time scale of use of the slurry in a polymerization process. As such, agitation of the slurry (e.g., cat pot 102) can be limited or unnecessary.

Paraffin waxes can include SONO JELL® paraffin waxes, such as SONO JELL® 4 and SONO JELL® 9 from Sonneborn, LLC. SONO JELL® paraffin waxes are compositions that typically contain 10 wt % or more of wax and up to 90 wt % of mineral oil. For example, a SONO JELL® paraffin wax can be 20 wt % wax and 80 wt % mineral oil. In at least one embodiment, a mineral oil slurry has 5 wt % or greater of wax, such as 10 wt % or greater, such as 25 wt % or greater, such as 40 wt % or greater, such as 50 wt % or greater, such as 60 wt % or greater, such as 70 wt % or greater. For example, a mineral oil slurry can have 70 wt % mineral oil, 10 wt % wax, and 20 wt % supported dual catalyst. It has been discovered that the increased viscosity provided by including a wax in the mineral oil slurry provides reduced settling of supported dual catalyst in a vessel or catalyst pot. It has further been discovered that using an increased viscosity mineral oil slurry does not inhibit trim efficiency.

Cat pot 102 is an agitated holding tank designed to keep the solids concentration homogenous. In at least one embodiment, cat pot 102 is maintained at an elevated temperature, such as from 30° C. to 75° C., such as from 40° C. to 45° C., for example about 43° C. or about 60° C. Elevated temperature can be obtained by electrically heat tracing cat pot 102 using, for example, a heating blanket. Cat pot 102 that is maintained at an elevated temperature can provide a wax-containing mineral oil slurry that has slurry stability for 6 days or more, e.g. a settling rate of supported catalyst of 40% or less after 6 days. Furthermore, it has been discovered that maintaining cat pot 102 at an elevated temperature can also reduce or eliminates foaming, in particular when a wax is present in the mineral oil slurry.

Without being bound by theory, a synergy provided by increased viscosity of the slurry provided by the wax and decreased viscosity provided by elevated temperature of the slurry can provide the reduced or eliminated foam formation in a cat pot vessel. Maintaining cat pot 102 at an elevated temperature can further reduce or eliminate solid residue formation on vessel walls which could otherwise slide off of the walls and cause plugging in downstream delivery lines. In at least one embodiment, cat pot 102 has a volume of from about 300 gallons to 2,000 gallons, such as from 400 gallons to 1,500 gallons, such as from 500 gallons to 1,000 gallons, such as from 500 gallons to 800 gallons, for example about 500 gallons.

In at least one embodiment, cat pot 102 is also maintained at pressure of 25 psig or greater, such as from 25 psig to 75 psig, such as from 30 psig to 60 psig, for example about 50 psig. Conventional trim processes involve slurry cylinders rolled at 25 psig, and foam is created when transferred down in pressure to the slurry vessel. It has been discovered that operating a slurry vessel (e.g., cat pot 102) at higher pressures can reduce or prevent foam.

In at least one embodiment, piping 130 and piping 140 of gas-phase reactor system 100 is maintained at an elevated temperature, such as from 30° C. to 75° C., such as from 40° C. to 45° C., for example about 43° C. or about 60° C. Elevated temperature can be obtained by electrically heat tracing piping 130 and or piping 140 using, for example, a heating blanket. Maintaining piping 130 and or piping 140 at an elevated temperature can provide the same or similar benefits as described for an elevated temperature of cat pot 102.

A catalyst component solution, prepared by mixing a solvent and at least one catalyst compound and/or activator, is placed in another vessel, such as a trim pot 104. Trim pot 104 can have a volume of from about 100 gallons to 2,000 gallons, such as from 100 gallons to 1,500 gallons, such as from 200 gallons to 1,000 gallons, such as from 200 gallons to 500 gallons, for example about 300 gallons. Trim pot 104 can be maintained at an elevated temperature, such as from 30° C. to 75° C., such as from 40° C. to 45° C., for example about 43° C. or about 60° C. Elevated temperature can be obtained by electrically heat tracing trim pot 104 using, for example, a heating blanket. Maintaining trim pot 104 at an elevated temperature can provide reduced or eliminated foaming in piping 130 and or piping 140 when the catalyst component slurry from cat pot 102 is combined in-line (also referred to herein as "on-line") with the catalyst component solution from trim pot 104.

It has been discovered that if the catalyst component slurry includes a wax, then it is advantageous that a diluent of the catalyst component solution have a viscosity that is greater than the viscosity of an alkane solvent, such as isopentane (iC5) or isohexane (iC6). Using iC5 or iC6 as a diluent in a trim pot can promote catalyst settling and static mixer plugging. Accordingly, in at least one embodiment, the catalyst component slurry of cat pot 102 includes a wax, as described above, and the catalyst component solution of trim pot 104 includes a diluent that is mineral oil. It has been discovered that trim efficiency is maintained or improved using wax in the catalyst component slurry and mineral oil in the catalyst component solution. Furthermore, use of wax and mineral oil reduces or eliminates the amount of iC5 and iC6 used in a trim process, which can reduce or eliminate emissions of volatile material (such as iC5 and iC6). Mineral oil can have a density of from 0.85 g/cm$^3$ to 0.9 g/cm$^3$ at 25° C. according to ASTM D4052, such as from 0.86 g/cm$^3$ to 0.88 g/cm$^3$. Mineral oil can have a kinematic viscosity at 40° C. of from 70 cSt to 240 cSt according to ASTM D445, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HB380 from Sonneborn, LLC or HydroBrite 1000 white mineral oil.

The catalyst component slurry can then be combined in-line with the catalyst component solution to form a final catalyst composition. A nucleating agent 106, such as silica, alumina, fumed silica or any other particulate matter may be added to the slurry and/or the solution in-line or in the vessels 102 or 104. Similarly, additional activators or catalyst compounds may be added in-line. For example, a second catalyst slurry (catalyst component solution) that includes a different catalyst may be introduced from a second cat pot (which may include wax and mineral oil). The two catalyst slurries may be used as the catalyst system with or without the addition of a solution catalyst from the trim pot.

The catalyst component slurry and solution can be mixed in-line. For example, the solution and slurry may be mixed by utilizing a static mixer 108 or an agitating vessel. The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 2 to about 20 minutes, or about 3 to about 10 minutes.

In at least one embodiment, static mixer 108 of gas-phase reactor system 100 is maintained at an elevated temperature, such as from 30° C. to 75° C., such as from 40° C. to 45° C., for example about 43° C. or about 60° C. Elevated temperature can be obtained by electrically heat tracing static mixer 108 using, for example, a heating blanket. Maintaining static mixer 108 at an elevated temperature can provide reduced or eliminated foaming in static mixer 108 and can promote mixing of the catalyst component slurry and catalyst solution (as compared to lower temperatures) which reduces run times in the static mixer and for the overall polymerization process.

When combining the catalysts, the activator and the optional support or additional co-catalysts in the hydrocarbon solvents immediately prior to a polymerization reactor, the combination can yield a new polymerization catalyst in less than 1 h, less than 30 min, or less than 15 min. Shorter times are more effective, as the new catalyst is ready before being introduced into the reactor, which can provide faster flow rates.

In another embodiment, an aluminum alkyl, an ethoxylated aluminum alkyl, an aluminoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 110 directly to the combination of the solution and the slurry, or may be added via an additional alkane (such as hexane, heptane, and or octane) carrier stream, for example, from a carrier vessel 112. The additional alkyls, antistatic agents, borate activators and/or aluminoxanes may be present at up to 500 ppm, at 1 to 300 ppm, at 10 ppm to 300 ppm, or at 10 to 100 ppm. A carrier gas 114 such as nitrogen, argon, ethane, propane, and the like, may be added in-line to the mixture of the slurry and the solution. Typically the carrier gas may be added at the rate of about 1 to about 100 lb/hr (0.4 to 45 kg/hr), or about 1 to about 50 lb/hr (5 to 23 kg/hr), or about 1 to about 33 lb/hr (0.4 to 15 kg/hr).

A condensing agent can be added directly to the reactor and or piping 140 (e.g., the combination of the solution and the slurry), for example, from a condensing agent vessel 180. Condensing agents include $C_3$-$C_7$ hydrocarbons, such as $iC_5$, nC5, $iC_4$, and $nC_4$. The condensing agent may be added introduced into the reactor or the line (e.g., contacted with the mixture of the slurry and the solution), such that the condensing agent is from 0.1 mol % to 50 mol % of components (e.g., monomers, comonomers, $H_2$, and condensing agent) in the top (vapor) portion of the reactor, such as from 0.1 mol % to 40 mol %, such as from 1 mol % to 25 mol %, such as from 12 mol % to 25 mol %, such as from 8 mol % to 17 mol %, such as from 3 mol % to 18 mol %, such as from 5 mol % to 12 mol %. It has been discovered that providing a controlled amount of condensing agent to a polymerization can control the Mw, MI, HLMI, and MIR of a polymer product without substantially affecting polymer density. Without being bound by theory, a condensing agent can alter the concentration of comonomer present at a catalyst active site during polymerization, thus affecting comonomer incorporation (and Mw, MI, MWD and MIR), but without affecting the density of the polymer product. In some embodiments, a molar ratio of first catalyst to second catalyst (before or after trimming the catalyst system) can be from about 1:99 to 99:1, such as from 85:15 to 50:50, such as from 80:20 to 50:50, such as from 70:30 to 50:50. The amount of condensing agent can be adjusted during a polymerization, e.g. from 5 mol % to 11.5 mol %, which can adjust one or more polymer properties. For example, if iC5 is provided to a polymerization at 5.5 mol % to provide polymer with an MIR of 52, the iC5 content can be increased to 11 mol % to provide polymer product having an MIR of 65.

In at least one embodiment, a liquid carrier stream is introduced into the combination of the solution and slurry. The mixture of the solution, the slurry and the liquid carrier stream may pass through a mixer or length of tube for mixing before being contacted with a gaseous carrier stream. Similarly, a comonomer 116, such as hexene, another alpha-olefin, or diolefin, may be added in-line to the mixture of the slurry and the solution.

In one embodiment, a gas stream 126, such as cycle gas, or re-cycle gas 124, monomer, nitrogen, or other materials is introduced into an injection nozzle 300 having a support tube 128 that surrounds an injection tube 120. The slurry/solution mixture is passed through the injection tube 120 to a reactor 122. In some embodiments, the injection tube may aerosolize the slurry/solution mixture. Any number of suitable tubing sizes and configurations may be used to aerosolize and/or inject the slurry/solution mixture.

FIG. 2 is a schematic diagram of nozzle 300 which can be configured in a variety of ways. As shown in FIG. 2, injection nozzle 300 is in fluid communication with one or more feed lines (three are shown in FIG. 2) 240A, 242A, 244A. Each feed line 240A, 242A, 244A provides an independent flow path for one or more monomers, purge gases, catalyst and/or catalyst systems to any one or more of the conduits 220 and 240. Feed line 240A or 242A provides the feed provided by piping 140 (shown in FIG. 1), and the remaining feed lines independently provide feeds from piping of a similar or same apparatus, such as the trim feed apparatus of FIG. 1. Alternatively, feed lines 240A, 242A, and 244A independently provide catalyst slurry, catalyst component solution, liquid carrier stream, monomer, or comonomer. The first conduit 240 may either protrude farther into the reactor than the second conduit 220 or be slightly recessed depending on the desired configuration. The first conduit 240 may be conventional tubing or it may have openings allowing flow into the annulus outside first conduit 240 and inside the second conduit 220.

Any of the one or more catalyst or catalyst systems, purge gases, condensing agents and monomers can be injected into any of the one or more feed lines 240A, 242A, 244A. The one or more catalyst or catalyst systems can be injected into the first conduit 240 using the first feed line 240A. Purge or inert gases and/or condensing agent may also be present in the first feed line 240A. The one or more purge gases or inert gases and condensing agent can be injected into the second conduit 220 using the second feed line 242A. The one or more monomers or a slipstream of "cycle gas" with the same composition as line 124 in FIG. 1 can be injected into the support member 128 using the third feed line 244A. The feed lines 240A, 242A, 244A can be any conduit capable of transporting a fluid therein. Suitable conduits can include tubing, flex hose, and pipe. A condensing agent can be injected into first conduit 240, second conduit 220, and/or support member 128 via respective feed lines 240A, 242A, and/or 244A, alone or in combination with the other components moving through the conduits, support member, and/or feed lines. A three way valve 215 can be used to introduce and control the flow of the fluids (i.e. catalyst slurry, purge gas and monomer) to the injection nozzle 300. Any suitable commercially available three way valve can be used.

In at least one embodiment, a nozzle is a conventional "slurry" nozzle having a first conduit that is conventional tubing and typically protrudes farther into the reactor than a second conduit. The preceding paragraph describes acceptable configurations.

In at least one embodiment, nozzle 300 is an "effervescent" nozzle. It has been discovered that use of an effervescent nozzle can provide a 3-fold increase or more in nozzle efficiency of a trim process as compared to conventional slurry nozzles. A suitable effervescent nozzle for at least one embodiment of the present disclosure is shown in U.S. Patent Pub. No. 2010/0041841 A1.

Support member 128 can include a first end having a flanged section 252. The support member 128 can also include a second end that is open to allow a fluid to flow there through. In one or more embodiments, support member 128 is secured to a reactor wall 210. In one or more embodiments, flanged section 252 can be adapted to mate or abut up against a flanged portion 205 of the reactor wall 210 as shown.

The flow through support tube 128 can be from 50 kg/hr to 1,150 kg/hr, such as from 100 kg/hr to 950 kg/hr, such as from 100 kg/hr to 500 kg/hr, such as from 100 kg/hr to 300 kg/hr, such as from 180 kg/hr to 270 kg/hr, such as from 150 kg/hr to 250 kg/hr, for example about 180 kg/hr. These flow rates can be achieved by a support tube, such as support tube 128, having a diameter of from ¼ inch to ¾ inch, for example about ½ inch. A diameter of from ¼ inch to ¾ inch has been discovered to provide reduced flow rates as compared to conventional trim process flow rates (e.g., 1,200 kg/hr), which further provides reduced overall amounts of liquid carrier (such as iC5) and nitrogen used during a polymerization process.

In at least one embodiment, a carrier gas flow rate is from 1 kg/hr to 50 kg/hr, such as from 1 kg/hr to 25 kg/hr, such as from 2 kg/hr to 20 kg/hr, such as from 2.5 kg/hr to 15 kg/hr. In at least one embodiment, a carrier fluid flow rate is from 1 kg/hr to 100 kg/hr, such as from 2 kg/hr to 50 kg/hr, such as from 2 kg/hr to 30 kg/hr, such as from 3 kg/hr to 25 kg/hr, for example about 15 kg/hr.

Returning to FIG. 1, to promote formation of particles in the reactor 122, a nucleating agent 118, such as fumed silica, can be added directly into the reactor 122. Conventional trim polymerization processes involve a nucleating agent introduced into a polymerization reactor. However, processes of the present disclosure have provided advantages such that addition of a nucleating agent (such as spray dried fumed silica) to the reactor is merely optional. For embodiments of processes of the present disclosure that do not include a nucleating agent, it has been discovered that a high polymer bulk density (e.g., 0.4 g/cm$^3$ or greater) can be obtained, which is greater than the bulk density of polymers formed by conventional trim processes. Furthermore, when a metallocene catalyst or other similar catalyst is used in the gas phase reactor, oxygen or fluorobenzene can be added to the reactor 122 directly or to the gas stream 126 to control the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propylcyclopentadienyl) zirconium dichloride and [(2,4,6-Me$_3$C$_6$H$_2$)NCH$_2$CH$_2$)]$_2$NHZrBn$_2$, where Me is methyl or bis(indenyl)zirconium dichloride and [(2,4,6-Me$_3$C$_6$H$_2$)NCH$_2$CH$_2$)]$_2$NHHfBn$_2$, where Me is methyl. For example, if the oxygen concentration in the nitrogen feed is altered from 0.1 ppm to 0.5 ppm, significantly less polymer from the bisindenyl ZrCl$_2$ will be produced and the relative amount of polymer produced from the [(2,4,6-Me$_3$C$_6$H$_2$)NCH$_2$CH$_2$)]$_2$NHHfBn$_2$ is increased. WO 1996/009328 discloses the addition of water or carbon dioxide to gas phase polymerization reactors, for example, for similar purposes.

The example above is not limiting, as additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, and each are independently combined, in-line, with the slurry.

Use of Catalyst Composition to Control Product Properties

The properties of the product polymer may be controlled by adjusting the timing, temperature, concentrations, and sequence of the mixing of the solution, the slurry and any optional added materials (condensing agent, nucleating agents, catalyst compounds, activators, etc.) described above. The MWD, MI, density, MIR, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, or changing the amount of the second catalyst in the polymerization system. Other process parameters that can be adjusted include changing the relative ratio of the catalyst in the polymerization process (and optionally adjusting their individual feed rates to maintain a steady or constant polymer production rate). The concentrations of reactants in the reactor 122 can be adjusted by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further process parameters including concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final polymer product.

In one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In one embodiment, a polymer product property is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. In another embodiment, the molar ratio of a Group 15 catalyst compound in the slurry to a metallocene catalyst compound in the solution, after the slurry and solution have been mixed to form the catalyst composition, is 500:1, 100:1, 50:1, 10:1, or 5:1. The product property measured can include the dynamic shear viscosity, flow index, melt index, density, MWD, comonomer content, and combinations thereof. In another embodiment, when the ratio of the catalyst compounds is altered, the introduction rate of the catalyst composition to the reactor, or other process parameters, is altered to maintain a desired production rate.

Polymerization Process

Figure 2:
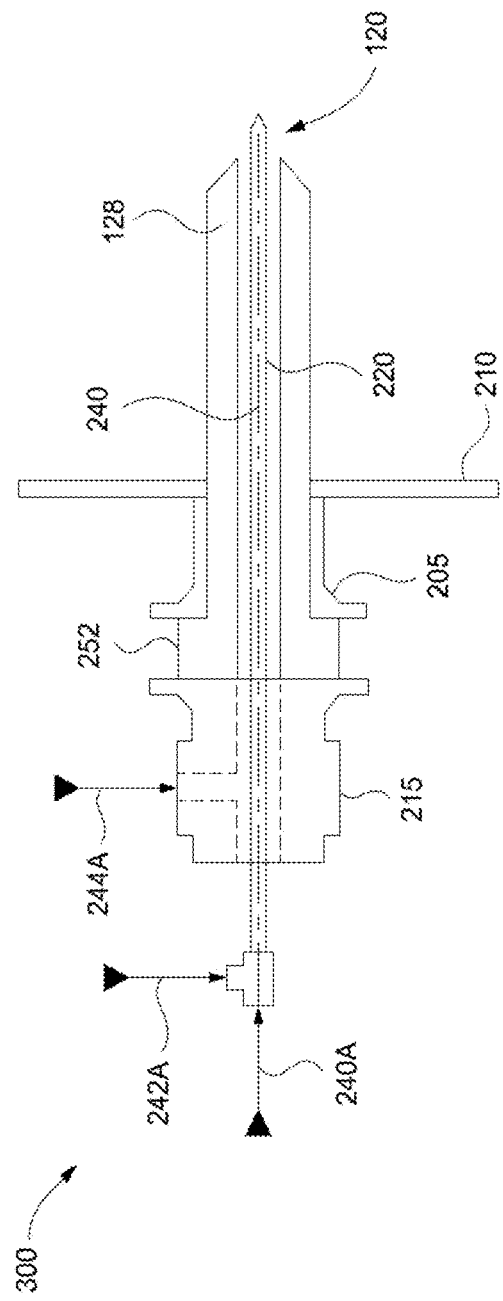
FIG. 2 is a schematic of a nozzle, according to one embodiment.
Figure 3A:
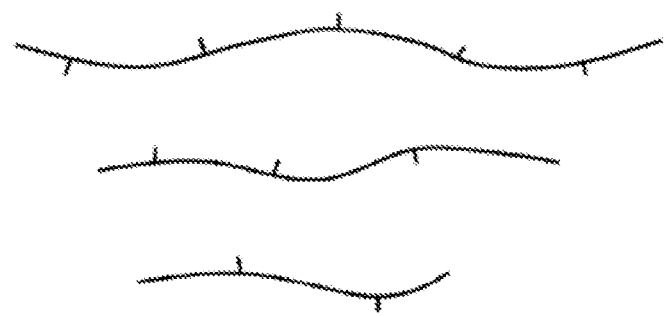
FIG. 3a is an illustration of a polyolefin with narrow composition distribution (NCD).
Figure 3B:
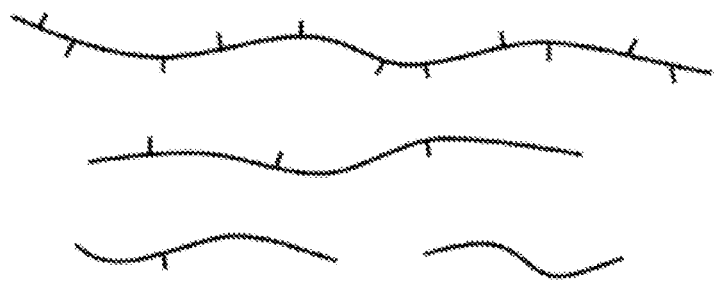
FIG. 3b is an illustration of a polyolefin with broad orthogonal composition distribution (BOCD).

The catalyst system can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 1 and or FIG. 2 can be used. For example, a trim system may be used to feed catalyst to a loop slurry reactor for polyethylene copolymer production.

The terms "polyethylene" and "polyethylene copolymer" refer to a polymer having at least 50 wt % ethylene derived units. In various embodiments, the polyethylene can have at least 70 wt % ethylene-derived units, at least 80 wt % ethylene-derived units, at least 90 wt % ethylene-derived units, or at least 95 wt % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 1, the fluidized bed reactor 122 can include a reaction zone 132 and a velocity reduction zone 134. The reaction zone 132 can include a bed 136 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 124 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 132 can be passed to the velocity reduction zone 134 where entrained particles are removed, for example, by slowing and falling back to the reaction zone 132. If desired, finer entrained particles and dust can be removed in a separation system 138, such as a cyclone and/or fines filter. The gas 124 can be passed through a heat exchanger 144 where at least a portion of the heat of polymerization can be removed. The gas can then be compressed in a compressor 142 and returned to the reaction zone 132. Alternately, compressor 142 can be located upstream (not shown) of exchanger 144. Additional reactor details and means for operating the reactor 122 are described in, for example, U.S. Pat. Nos. 3,709,853; 4,003,712; 4,011,382; 4,302,566; 4,543,399; 4,882,400; 5,352,749; and 5,541,270; EP 0802202; and BE Patent No. 839,380.

The reactor temperature of the fluid bed process can be greater than 30° C., greater than 40° C., greater than 50° C., greater than 90° C., greater than 100° C., greater than 110° C., greater than 120° C., greater than 150° C., or higher. In general, the reactor temperature is operated at a suitable temperature taking into account the sintering temperature of the polymer product within the reactor. Thus, the upper temperature limit in one embodiment is the melting temperature of the polyethylene copolymer produced in the reactor. However, higher temperatures may result in narrower MWDs, which can be improved by the addition of a catalyst, or other co-catalysts, as described herein.

Hydrogen gas can be used in olefin polymerization to control the final properties of the polyolefin, such as described in the "Polypropylene Handbook, at pages 76-78 (Hanser Publishers, 1996). Using certain catalyst systems, increasing concentrations (partial pressures) of hydrogen can increase a flow index such as MI of the polyethylene copolymer generated. The MI can thus be influenced by the hydrogen concentration. The amount of hydrogen in the polymerization can be expressed as a mole ratio relative to the total polymerizable monomer, for example, ethylene, or a blend of ethylene and hexene or propylene.

The polymerization conditions in some embodiments include: a hydrogen concentration in the range of from 50 ppm to 2000 ppm, or from 150 ppm to 600 ppm, or from 300 ppm to 450 ppm; an ethylene concentration in the range of from 35 mol % to 95 mol %, or from 45 mol % to 85 mol %, or from 55 mol % to 75 mol %; a comonomer concentration in the range of from .2 mol % to 2 mol %, or from .7 mol % to 1.5 mol %, or from .9 mol % to 1.3 mol %; a reactor pressure in the range of from 200 psig to 500 psig, or from 270 psig to 320 psig, or from 280 psig to 305 psig; and a reactor temperature in the range of from 100° F. to 250° F., or from 160° F. to 205° F., or from 175° F. to 190° F. Other ranges are disclosed by combining any lower endpoint of any individual range can be used with any upper endpoint of that range. Any range from one operating parameter can be combined with any range from other operating parameters to define additional embodiments.

The gas phase reactor can be capable of producing from 10 kg of polymer per hour (25 lbs/hr) to 90,900 kg/hr (200,000 lbs/hr), or greater, and greater than 455 kg/hr (1,000 lbs/hr), greater than 4.540 kg/hr (10,000 lbs/hr), greater than 11,300 kg/hr (25,000 lbs/hr), greater than 15,900 kg/hr (35,000 lbs/hr), and greater than 22,700 kg/hr (50,000 lbs/hr), and from 29,000 kg/hr (65,000 lbs/hr) to 45,500 kg/hr (100,000 lbs/hr) or from 45,450 kg/hr (100,000 lbs/hr) to 90,900 kg/hr (200,000 lbs/hr), such as 45,450 kg/hr (100,000 lbs/hr) to 68,175 kg/hr (150,000 lbs/hr), such as 45,450 kg/hr (100,000 lbs/hr) to 59,085 kg/hr (130,000 lbs/hr) alternatively from 68,175 kg/hr (150,000 lbs/hr) to 81,810 kg/hr (180,000 lbs/hr).

Polymerization Processes

In embodiments herein, the invention relates to polymerization processes where monomer (such as propylene and or ethylene), and optionally comonomer, are contacted with a catalyst system comprising at least one activator, at least one support and at least two catalyst compounds, such as the metallocene compounds described above. The support, catalyst compounds, and activator may be combined in any order, and are combined typically prior to contacting with the monomers.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof.

In an embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the present disclosure can be carried out in any manner known in the art. Any suspension, slurry, high pressure tubular or autoclave process, or gas phase polymerization process known in the art can be used under polymerizable conditions. Such processes can be run in a batch, semi-batch, or continuous mode. Heterogeneous polymerization processes (such as gas phase and slurry phase processes) are useful. A heterogeneous process is defined to be a process where the catalyst system is not soluble in the reaction media. Alternatively, in other embodiments, the polymerization process is not homogeneous.

A homogeneous polymerization process is defined to be a process where preferably at least 90 wt % of the product is soluble in the reaction media. Alternatively, the polymerization process is not a bulk process. In a class of embodiments, a bulk process is defined to be a process where monomer concentration in all feeds to the reactor is preferably 70 vol % or more. Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers and as described above. Typical pressures include pressures in the range of from about 0.35 MPa to about 10 MPa, preferably from about 0.45 MPa to about 6 MPa, or preferably from about 0.5 MPa to about 4 MPa in some embodiments.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a class of embodiments, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

In another embodiment of the invention, the polymerization is performed in the slurry phase. A slurry polymerization process generally operates between 1 to about 50 atmosphere pressure range (15 psi to 735 psi, 103 kPa to 5068 kPa) or even greater and temperatures as described above. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In a preferred embodiment, the catalyst system used in the polymerization comprises no more than two catalyst compounds. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Useful reactor types and/or processes for the production of polyolefin polymers include, but are not limited to, UNIPOL™ Gas Phase Reactors (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals)); BORSTAR™ Process and Reactors (slurry combined with gas phase); and Multi-Zone Circulating Reactors (MZCR) such as SPHERIZONE™ Reactors and Process available from Lyondell Basell.

In several classes of embodiments, the catalyst activity of the polymerization reaction is at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater.

In a preferred embodiment, the polymerization:
1) is conducted at temperatures of 0 to 300° C. (preferably 25 to 150° C., preferably 40 to 120° C., preferably 45 to 85° C.);
2) is conducted at a pressure of atmospheric pressure to 10 MPa (preferably 0.35 to 10 MPa, preferably from 0.45 to 6 MPa, preferably from 0.5 to 4 MPa);
3) is conducted in an aliphatic hydrocarbon solvent (such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents);
4) wherein the catalyst system used in the polymerization preferably comprises bis(1-ethyl-indenyl) zirconium dimethyl, bis(n-propyl-cyclopentadienyl) hafnium dimethyl, a support such as silica, and an activator (such as methylalumoxane, N,N-dimethylanilinium tetrakis(pentafluorophenyl)borate, or N,N-dimethylanilinium tetrakis(perfluoronaphthyl)borate);
5) the polymerization preferably occurs in one reaction zone;
6) the productivity of the catalyst compound is at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater;
7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and
8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

Polyolefin Products

In an embodiment, the process described herein produces polyolefin compositions including homopolymers and copolymers of one, two, three, four or more $C_2$ to $C_{40}$ olefin monomers, for example, $C_2$ to $C_{20}$ α-olefin monomers.

For example, the polyethylene compositions include copolymers of a $C_2$ to $C_{40}$ olefin and one, two or three or more different $C_2$ to $C_{40}$ olefins, (where the $C_2$ to $C_{40}$ olefins are preferably $C_3$ to $C_{20}$ olefins, preferably are $C_3$ to $C_{12}$ α-olefin, preferably are propylene, butene, hexene, octene, decene, dodecene, preferably propylene, butene, hexene, octene, or a mixture thereof).

The polyethylene composition may comprise from 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 0.5 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins, such as hexene and octene. The α-olefin comonomer may be linear or branched, and two or more comonomers may be used, if desired.

Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

The polyethylene composition may have a melt index, $I_{2.16}$, according to the test method listed below, of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28 g/10 min, or ≥about 0.30 g/10 min and, also, a melt index ($I_{2.16}$) ≤about 3.00 g/10 min, e.g., ≤about 2.00 g/10 min, ≤about 1.00 g/10 min, ≤about 0.70 g/10 min, ≤about 0.50 g/10 min, ≤about 0.40 g/10 min, or ≤about 0.30 g/10 min. Ranges expressly disclosed include, but are not limited to, ranges formed by combinations any of the above-enumerated values, e.g., about 0.10 to about 0.30, about 0.15 to about 0.25, about 0.18 to about 0.22 g/10 min, etc. In another embodiment, the melt index could be about 0.1 g/10 min to about 30 g/10 min, such as about 20 g/10 min to about 30 g/10 min.

The polyethylene composition may have a high load melt index (HLMI) ($I_{21.6}$) in accordance with the test method listed below of from 1 to 60 g/10 min, 5 to 40 g/10 min, 5 to 50 g/10 min, 15 to 50 g/10 min, or 20 to 50 g/10 min.

The polyethylene composition may have a melt index ratio (MIR), from 10 to 90, from 20 to 45, from 25 to 60, alternatively, from 30 to 55, alternatively, from 35 to 55, and alternatively, from 35 to 50 or 35 to 45. MIR is defined as $I_{21.6}/I_{2.16}$.

The polyethylene composition may have a density of about 0.920 g/cm³, about 0.918 g/cm³, or ≥about 0.910 g/cm³, e.g., ≥about 0.919 g/cm³, ≥about 0.92 g/cm³, ≥about 0.930 g/cm³, ≥about 0.932 g/cm³. Additionally, the polyethylene composition may have a density ≤about 0.945 g/cm³, e.g., ≤about 0.940 g/cm³, ≤about 0.937 g/cm³, ≤about 0.935 g/cm³, ≤about 0.933 g/cm³, or ≤about 0.930 g/cm³. Ranges expressly disclosed include, but are not limited to, ranges formed by combinations any of the above-enumerated values, e.g., about 0.919 to about 0.945 g/cm³, 0.920 to 0.930 g/cm³, 0.925 to 0.935 g/cm³, 0.920 to 0.940 g/cm³, etc. Density is determined in accordance with the test method listed below.

The polyethylene composition may have a molecular weight distribution (MWD, defined as $M_w/M_n$) of about 2 to about 12, about 5 to about 10.5 or 11, about 2.5 to about 5.5, preferably 4.0 to 5.0 and about 4.4 to 5.0.

In a class of embodiments, the polyethylene composition comprises at least 65 wt % ethylene derived units and from 0.1 to 35 wt % of $C_3$-$C_{12}$ olefin comonomer derived units, based upon the total weight of the polyethylene composition; wherein the polyethylene composition has:
  a) an RCI,m of 100 kg/mol or greater, alternatively, 110 kg/mol or greater, alternatively, 125 kg/mol or greater, alternatively, 150 kg/mol or greater, alternatively, 170 kg/mol or greater, and alternatively, 185 kg/mol or greater;
and one or both of:
  b) a $Tw_1$-$Tw_2$ value of from −16 to −38° C., alternatively, a $Tw_1$-$Tw_2$ value of from −23 to −36° C., and alternatively, a $Tw_1$-$Tw_2$ value of from −23 to −33° C.; and
  c) an $Mw_1/Mw_2$ value of at least 0.9, alternatively, an $Mw_1/Mw_2$ value of from 0.9 to 4, and alternatively, an $Mw_1/Mw_2$ value of from 1.25 to 4;
and one or more of the following:
  d) a density of from 0.890 g/cm³ to 0.940 g/cm³;
  e) a melt index (MI) of from 0.1 g/10 min to 30 g/10 min, alternatively, a melt index (MI) of from 0.1 g/10 min to 6 g/10 min;
  f) a melt index ratio ($I_{21}/I_2$) of from 10 to 90;
  g) an $M_w/M_n$ of from 2 to 12;
  h) an $M_z/M_w$ of from 2.5 to 5.0;
  i) an $M_z/M_n$ of from 10 to 40; and
  j) a g'(vis) of 0.900 or greater, alternatively, 0.930 or greater, alternatively, 0.940 or greater, and alternatively 0.994 or greater.

This invention also relates to polyethylene compositions comprising at least 65 wt % ethylene derived units and from 0.1 to 35 wt % of $C_3$-$C_{12}$ olefin comonomer derived units, based upon the total weight of the polyethylene composition; wherein the polyethylene composition has:
  a) an RCI,m of 100 kg/mol or greater, such as 150 kg/mol or greater;
and one or more of the following:
  b) a density of from 0.890 g/cm³ to 0.940 g/cm³;
  c) a melt index (MI) of from 0.1 g/10 min to 30 g/10 min;
  d) a melt index ratio ($I_{21}/I_2$) of from 10 to 90, such 25 to 55, or 30 to 40;
  e) an $M_w/M_n$ of from 2 to 16, such as 9 to 14, or 10 to 14;
  f) an $M_z/M_w$ of from 2.5 to 5.0;
  g) an $M_z/M_n$ of from 10 to 50, such as 25 to 50, or 25 to 45; and
  h) a g'(vis) of 0.900 or greater.

In any of the embodiments described herein, the polyethylene composition may be a multimodal polyethylene composition such as a bimodal polyethylene composition. As used herein, "multimodal" means that there are at least two distinguishable peaks in a molecular weight distribution curve (as determined using gel permeation chromatography (GPC) or other recognized analytical technique) of a polyethylene composition. For example, if there are two distinguishable peaks in the molecular weight distribution curve such composition may be referred to as bimodal composition. Typically, if there is only one peak (e.g., monomodal), no obvious valley between the peaks, either one of the peaks is not considered as a distinguishable peak, or both peaks are not considered as distinguishable peaks, then such a composition may be referred to as non-bimodal. For example, in U.S. Pat. Nos. 8,846,841 and 8,691,715, FIGS. 1-5 illustrate representative bimodal molecular weight distribution curves. In these figures, there is a valley between the peaks, and the peaks can be separated or deconvoluted. Often, a bimodal molecular weight distribution is characterized as having an identifiable high molecular weight component (or distribution) and an identifiable low molecular weight component (or distribution). In contrast, in U.S. Pat. Nos. 8,846,841 and 8,691,715, FIGS. 6-11 illustrate representative non-bimodal molecular weight distribution curves. These include unimodal molecular weight distributions as well as distribution curves containing two peaks that cannot be easily distinguished, separated, or deconvoluted.

In any of the embodiments described herein, the polyethylene composition may have an internal unsaturation as measured by $^1$H NMR (see below for the test method) of more than 0.2 total internal unsaturations per thousand carbon atoms, alternatively, more than 0.3 total internal unsaturations per thousand carbon atoms, alternatively, more than 0.32 total internal unsaturations per thousand carbon atoms, alternatively, more than 0.38 total internal unsaturations per thousand carbon atoms, and alternatively, more than 0.4 total internal unsaturations per thousand carbon atoms.

Blends

In another embodiment, the polymer (preferably the polyethylene or polypropylene) or polyethylene composition produced herein is combined with one or more additional polymers in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

Useful additional polymers include other polyethylenes, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

End Uses

Any of the foregoing polymers and compositions in combination with optional additives (see, for example, U.S. Patent Application Publication No. 2016/0060430, paragraphs [0082]-[40093]) may be used in a variety of end-use applications. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

Films

Films include monolayer or multilayer films. Films include those film structures and film applications known to those skilled in the art. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any conventional technique known to those skilled in the art, such as for example, techniques utilized to prepare blown, extruded, and/or cast stretch and/or shrink films (including shrink-on-shrink applications).

In one embodiment, multilayer films or multiple-layer films may be formed by methods well known in the art. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

To facilitate discussion of different film structures, the following notation is used herein. Each layer of a film is denoted "A" or "B". Where a film includes more than one A layer or more than one B layer, one or more prime symbols (', ", '", etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

The thickness of each layer of the film, and of the overall film, is not particularly limited, but is determined according to the desired properties of the film. Typical film layers have a thickness of from about 1 to about 1000 μm, more typically from about 5 to about 100 μm, and typical films have an overall thickness of from about 10 to about 100 μm.

In some embodiments, and using the nomenclature described above, the present invention provides for multilayer films with any of the following exemplary structures:

(a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"'/B"'; (d) five-layer films, such as A/A'/A"/A"'/B, A/A'/A"/B/A"', A/A'/B/A'/A"', A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"/B"', B/A/B'/B"'/B"', B/B'/A/B"/B"', and B/B'/B"/B"'/B""; and similar structures for films having six, seven, eight, nine, twenty-four, forty-eight, sixty-four, one hundred, or any other number of layers. It should be appreciated that films having still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and other materials capable of accepting a coating.

The films can further be embossed, or produced or processed according to other known film processes. The films can be tailored to specific applications by adjusting the thickness, materials and order of the various layers, as well as the additives in or modifiers applied to each layer.

Preferably, the articles (preferably films) produced herein have an average MD/TD modulus ((MD+TD)/2)) that is greater than X, where X=(2,065,292*density of ethylene polymer)−1,872,345, preferably the inventive films have an average modulus of 1.2*X, preferably 1.3*X, preferably 1.4*X.

Preferably, the articles (preferably films) produced herein have an average MD/TD modulus of between 30,000 psi and 40,000 psi.

Preferably, the articles (preferably films) produced herein have a dart drop impact resistance of 600 g/mil or greater.

Preferably, the articles (preferably films) produced herein have a dart drop impact resistance of 700 g/mil or greater.

Preferably, the films produced herein have an Elmendorf tear resistance of 300 g/mil or greater in the machine direction (MD).

Preferably, the preferably films produced herein have an Elmendorf tear resistance of 200 g/mil or greater in the machine direction (MD), preferably 300 g/mil or more, preferably 350 g/mil or more.

Preferably, the articles (preferably films) produced herein have a haze of 12% or less.

Preferably, the ethylene polymers produced herein have an MIR of 35 to 55, and a film produced therefrom has an Elmendorf tear resistance of 300 g/mil (or at least 450 g/mil or greater or at least 500 g/mil or greater) in the machine direction (MD), and/or a dart drop impact resistance of at least 500 g/mil or greater (or at least 750 g/mil or greater, or at least 800 g/mil or greater).

Stretch Films

The polymers and compositions as described above may be utilized to prepare stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

The polymers and compositions as described above may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films are commonly used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40.

Retail films are commonly used for packaging and/or bundling articles for consumer use, such as, for example, in supermarket goods. Such films are typically formed in a single bubble blown extrusion process to a thickness of about 35 to 80, μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

The polymers and compositions as described above may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Bags include those bag structures and bag applications known to those skilled in the art. Exemplary bags include shipping sacks, trash bags and liners, industrial liners, produce bags, and heavy duty bags.

Packaging

Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

The polymers and compositions described above may also be used in blow molding processes and applications. Such processes are well known in the art, and involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

The polymers and compositions described above may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

The polymers and compositions described above may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls.

Extrusion coating materials are typically used in food and non-food packaging, pharmaceutical packaging, and manufacturing of goods for the construction (insulation elements) and photographic industries (paper).

Foamed Articles

The polymers and compositions described above may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising the polymers and compositions described above. Such devices include, for example, electronic cables, computer and computer-related equipment, marine cables, power cables, telecommunications cables or data transmission cables, and combined power/telecommunications cables.

Electrical devices described herein can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Test Methods $^1$H NMR $^1$H NMR data was collected at 393K in a 10 mm probe using a Bruker spectrometer with a $^1$H frequency of 400 MHz (available from Agilent Technologies, Santa Clara, Calif.). Data was recorded using a maximum pulse width of 45° C., 5 seconds between pulses and signal averaging 512 transients. Spectral signals were integrated and the number of unsaturation types per 1000 carbons was calculated by multiplying the different groups by 1000 and dividing the result by the total number of carbons. $M_n$ was calculated by dividing the total number of unsaturated species into 14,000, and has units of g/mol.

TREF Method

Unless otherwise indicated, the TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 cm$^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

GPC 4D Procedure: Molecular Weight, Comonomer Composition and Long Chain Branching Determination by GPC-IR Hyphenated with Multiple Detectors The distribution and the moments of molecular weight ($M_w$, $M_n$, $M_w/M_n$, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}$=0.67 and $K_{PS}$=0.000175 while α and K are for other materials as calculated and published in literature (Sun, T. et al. *Macromolecules* 2001, 34, 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018* (w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The wt % comonomer is then obtained from the following expression in which ƒ is 0.3, 0.4, 0.6, 0.8, and so on for $C_3$, $C_4$, $C_6$, $C_8$, and so on co-monomers, respectively:

w2=ƒ*SCB/1000TC.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then w2b=ƒ*bulk CH3/1000TC bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions;* Huglin, M. B., Ed.; Academic Press, 1972.):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, A2 is the second virial coefficient, P(θ) is the form factor for a monodisperse random coil, and $K_o$ is the optical constant for the system:

$$K_o = \frac{4\pi^2 n^2 (dn/dc)^2}{\lambda^4 N_A},$$

where NA is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and A2=0.0015; for analyzing ethylene-butene copolymers, dn/dc=0.1048*(1−0.00126*w2) ml/mg and A2=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the equation $[\eta]=\eta s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index (g'vis) is calculated using the output of the GPC-IR5-LS-VIS method as follows. The average intrinsic viscosity, $[\eta]avg$, of the sample is calculated by:

$$[\eta]_{avg} = \frac{\sum c_i [\eta]_i}{\sum c_i},$$

where the summations are over the chromatographic slices, i, between the integration limits. The branching index g'vis is defined as $$g'_{vis} = \frac{[\eta]_{avg}}{KM_v^{\alpha}},$$

where Mv is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200w2}{-100n - 2w2 + nw2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that
$1 = \int_{-\infty}^{\infty} W' dz$,
and a modified weight-average molecular weight is calculated over the effectively reduced range of molecular weights as follows:

$$M_w' = \int_{-\infty}^{\infty} 10^z * W' dz.$$

The RCI,m is then computed as $$RCI,m = \int_{-\infty}^{\infty} x2 \, (10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100} (10^z - M_w') W' dz.$$

In the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw + Mn}{2}\right)},$$

$$CDR\text{-}3, w = \frac{w2\left(\frac{Mz + Mw}{2}\right)}{w2\left(\frac{Mw + Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw+Mn}{2}\right)},$$

$$CDR\text{-}3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

Cross-Fractionation Chromatography (CFC)

Cross-fractionation chromatography (CFC) analysis was done using a CFC-2 instrument from Polymer Char, S. A., Valencia, Spain. The principles of CFC analysis and a general description of the particular apparatus used are given in the article by Ortin, A.; Monrabal, B.; Sancho-Tello, 257 J. MACROMOL. SYMP. 13 (2007). A general schematic of the apparatus used is shown in FIG. 1 of this article. Pertinent details of the analysis method and features of the apparatus used are as follows.

The solvent used for preparing the sample solution and for elution was 1,2-dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 μm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography;* Springer, 1999. For polystyrene K=1.38×10$^4$ dl/g and α=0.7; and for polyethylene K=5.05×10$^4$ dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

Additional test methods include the following.

| Test Name | Method or description |
|---|---|
| Melt Index ($I_2$), High Load Melt Index ($I_{21}$) | ASTM D-1238 2.16 kg (MI) or 21.6 kg (HLMI), 190° C. |
| Density | ASTM D1505, column density. Samples were molded under ASTM D4703-10a, Procedure C , then conditioned under ASTM D618-08 (23° ± 2° C. and 50 ± 10% Relative Humidity) for 40 hours before testing |

Unless otherwise indicated, room/ambient temperature is approximately 23° C.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Catalyst Preparation

To a stirred reaction vessel was added toluene (2074 lbs) then MAO (1060 lbs; 30 wt % Albemarle) followed by a toluene solution of two metallocenes (92 lbs total solution; 12.7 wt % of the hafnocene; 4.2 wt % of the zirconocene). After stirring 60 minutes at 90° F. ES70 silica (PQ Corp) dehydrated at approximately 875° C. (879 lbs) was added to the vessel and stirred for about 1 hour at 90° F. The temperature was raised to approximately 165° F. the toluene was removed under reduced pressure for about 20 hours resulting a free flowing powder, yield=1226 lbs. All steps were performed under an atmosphere of dry nitrogen.

Catalyst systems (i.e., mixed/dual catalyst systems) were prepared using hafnocene (bis(n-propylCp)HfMe$_2$) and zirconocenes (rac/meso bis (1-Me-Ind)ZrMe$_2$) and (rac/meso bis (1-Me-Ind)ZrMe$_2$), where Me=methyl, Eth=ethyl, Ind=indenyl. Dimethyl leaving groups for the metallocenes were employed although di-chloro versions of the catalyst could have also been employed.

Upon evaluation and testing to produce LLDPE products, the results revealed high catalyst activity and unique BOCD LLDPE products.

Slurry Preparation

A jacketed mixer is preheated to 60° C. Mineral oil SJCS-380 from Sonneborn is transfer into this vessel. Oil is agitated under<3 psia vacuum at 60 C for 3 hours. The mixer is refilled with N2. Solid catalyst is transferred into the vessel using N2 pressure. The mixture is stirred for 2 hours, then cool to 40° C. The well mixed catalyst slurry is down-loaded into receiving containers.

Polymerization

Polymerization was conducted in an approximately 600 cubic meter (inclusive of cycle gas volume) gas phase reactor operating at a temperature of about 80° C., a pressure of about 20 barg, with a residence time of about 2.5 hours. Catalyst was fed into the reactor as a slurry and/or dry powder and monomers were both injected as gases. Steady state was achieved. Ethylene partial pressure was 13.8 bar. Hexene partial pressure was 0.22 bar. Isopentane was used as condensing agent. The polymerization conditions and properties of the polymer produced in each experimental run is set forth in Table 1.

TABLE 1

Reactor Conditions and Product Properties

| | Sample | | |
|---|---|---|---|
| | A | B | C |
| $H_2$ conc. (ppm) | 410 | 381 | 382 |
| Comonomer conc. (mol %) | 1.01 | 1.09 | 1.06 |
| Ethylene conc. (mol %) | 65.8 | 65.9 | 65.7 |
| Reactor pressure | 290 | 289 | 290 |
| Reactor temperature (° F.) | 178 | 181 | 181 |
| Catalyst slurry feed rate (cc/hr) | 35554 | 36283 | 44586 |
| Catalyst dry feed rate (g/hr) | 946 | 947 | 0 |
| Trim solution feed rate (g/hr) | 0 | 8706 | 2467 |
| Mw (g/mol) | 117064 | 122825 | 122318 |
| Mn (g/mol) | 19653 | 18725 | 19440 |
| Mz (g/mol) | 311480 | 342231 | 309710 |
| Mw/Mn | 5.96 | 6.56 | 6.29 |
| Mz/Mw | 2.66 | 2.79 | 2.53 |
| RCI,m (LS) (kg/mol) | 179.60 | 191.90 | 178.80 |
| CDR2,m | 1.96 | 1.93 | 1.79 |
| T75-T25 (° C.) | 23.70 | 23.80 | 22.90 |
| Hexene wt % | 8.36 | 8.24 | 8.37 |
| $g'_{vis}$ | 0.943 | 0.931 | 0.945 |
| Melt Index, MI (dg/min) | 1.23 | 1.12 | 1.22 |
| High Load Melt Index, HLMI (dg/min) | 42.7 (calc) | 42 | 42.822 |
| Melt Index Ratio, MIR | 34.7 | 37.5 | 35.1 |
| Gradient density (g/cm$^3$) | 0.9212 | 0.9221 | 0.9216 |
| Bulk density (g/cm$^3$) | 0.4895 | 0.4661 | 0.4761 |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for producing a polyolefin comprising:
   a. contacting a first composition and a second composition in a feed line to form a third composition, wherein:
      i. the first composition comprises:
         1. a first bimetallic catalyst, which is the contact product of i) a hafnocene catalyst, ii) a first zirconocene catalyst, iii) a support, and iv) an activator, wherein a mol ratio of hafnium to zirconium is from 95:5 to 70:30, and
         2. a diluent,
      ii. the second composition comprises a second zirconocene catalyst, which is the same as or different from the first zirconocene catalyst, and a solvent, wherein the second zirconocene catalyst is dissolved in the solvent to form a solution; and
      iii. the third composition comprises a second bimetallic catalyst having mol ratio of hafnium to zirconium of from 85:15 to 50:50
   b. introducing the third composition from the feed line into a gas-phase fluidized bed reactor;
   c. introducing feed components into the gas-phase fluidized bed reactor, the feed components comprising hydrogen, ethylene, and a $C_3$ to $C_{12}$ alpha olefin comonomer;
   d. exposing the third composition and the feed components to polymerization conditions comprising:
      i. a hydrogen concentration in a range of from 50 ppm to 2000 ppm,
      ii. an ethylene concentration in a range of from 35 mol% to 95 mol%,
      iii. a comonomer concentration in a range of from 0.2 mol% to 2 mol%,
      iv. a reactor pressure in a range of from 200 psig to 500 psig, and
      v. a reactor temperature in a range of from 100 degrees F. and 250 degrees F., and obtaining a polyolefin.

2. The method of claim 1 wherein the feed components further comprise a third bimetallic catalyst, which is the contact product of i) a hafnocene catalyst, ii) a zirconocene catalyst, iii) a support, and iv) an activator, wherein a mol ratio of hafnium to zirconium is from 95:5 to 70:30.

3. The method of claim 2 wherein the third bimetallic catalyst and the first bimetallic catalyst are the same.

4. The method of claim 2 wherein the third bimetallic catalyst and the first bimetallic catalyst are different.

5. The method of claim 1 wherein the third composition further comprises a $C_3$ to $C_{12}$ alpha olefin comonomer.

6. The method of claim 1 wherein the third composition further comprises a diolefin comonomer.

7. The method of claim 1 wherein the feed components further comprise a diolefin comonomer.

8. The method of claim 1 wherein the diluent is a mixture of mineral oil and wax.

9. The method of claim 1 wherein a condensing agent is added to the third composition and/or the feed components in an amount such that the condensing agent comprises from 0.1 mol% to 50 mol% of all components in a top portion of the reactor.

10. The method of claim 1 wherein the polyolefin is a polyethylene composition comprising at least 65 wt% ethylene derived units and from 0.1 to 35 wt% of $C_3$-$C_{12}$ olefin comonomer derived units, based upon a total weight of the polyethylene composition; wherein the polyethylene composition has:
   a) a reversed comonomer index (RCI,m) of 100 kg/mol or greater; and one or more of the following:
   b) a density of from 0.890 g/cm³ to 0.940 g/cm³;
   c) a melt index (MI) of from 0.1 g/10 min to 30 g/10 min;
   d) a melt index ratio ($I_{21}/I_2$) of from 10 to 90;
   e) an $M_w/M_n$ of from 2 to 16;
   f) an $M_z/M_w$ of from 2.5 to 5.0;
   g) an $M_z/M_n$ of from 10 to 50; and
   h) a branching index g'(vis) of 0.90 or greater.

11. A method for producing a polyolefin comprising:
   a. introducing a first composition into a gas-phase fluidized bed reactor, wherein the first composition comprises:
      i. a first bimetallic catalyst, which is a contact product of i) a hafnocene catalyst, ii) a zirconocene catalyst, iii) a support, and iv) an activator, wherein the mol ratio of hafnium to zirconium is from 95:5 to 70:30, and
      ii. a diluent,
   b. introducing feed components into the gas-phase fluidized bed reactor, the feed components comprising hydrogen, ethylene, a $C_3$ to $C_{12}$ alpha olefin comonomer, and a second bimetallic catalyst, which is a contact product of i) a hafnocene catalyst, ii) a zirconocene catalyst, iii) a support, and iv) an activator, wherein a mol ratio of hafnium to zirconium is from 95:5 to 70:30,
   c. exposing the first composition and the feed components to polymerization conditions comprising:
      i. a hydrogen concentration in a range of from 50 ppm to 2000 ppm,
      ii. an ethylene concentration in a range of from 35 mol% to 95mol%,
      iii. a comonomer concentration in a range of from 0.2 mol% to 2 mol%,
      iv. a reactor pressure in he a range of from 200 psig to 500 psig, and
      v. a reactor temperature in a range of from 100 degrees F. and 250 degrees F., and
   d. obtaining a polyolefin.

12. The method of claim 11 wherein the first bimetallic catalyst and the second bimetallic catalyst are the same.

13. The method of claim 11 wherein the first bimetallic catalyst and the second bimetallic catalyst are different.

14. The method of claim 11 wherein the first composition further comprises a $C_3$ to $C_{12}$ alpha olefin comonomer.

15. The method of claim 11 wherein the first composition further comprises a diolefin comonomer.

16. The method of claim 11 wherein the feed components further comprise a diolefin comonomer.

17. The method of claim 11 wherein the diluent is a mixture of mineral oil and wax.

18. The method of claim 11 wherein a condensing agent is added to the third composition and/or the feed components in an amount such that the condensing agent comprises from 0.1 mol% to 50 mol% of all components in a top portion of the reactor.

19. The method of claim 11 wherein the polyolefin is a polyethylene composition comprising at least 65 wt% ethylene derived units and from 0.1 to 35 wt% of $C_3$-$C_{12}$ olefin comonomer derived units, based upon a total weight of the polyethylene composition; wherein the polyethylene composition has:
   a) a reversed comonomer index RCI,m of 100 kg/mol or greater; and one or more of the following:
   b) a density of from 0.890 g/cm³ to 0.940 g/cm³;
   c) a melt index (MI) of from 0.1 g/10 min to 30 g/10 min;
   d) a melt index ratio ($I_{21}/I_2$) of from 10 to 90;
   e) an $M_w/M_n$ of from 2 to 16;
   f) an $M_z/M_w$ of from 2.5 to 5.0;
   g) an $M_z/M_n$ of from 10 to 50; and
   h) a branching index g'(vis) of 0.90 or greater.

* * * * *